(12) United States Patent
Poletto

(10) Patent No.: US 12,475,397 B1
(45) Date of Patent: Nov. 18, 2025

(54) CALIBRATING AN AUGMENTED GROUP OF OPERATIONS FOR EXECUTION ON A QUANTUM PROCESSING UNIT

(71) Applicant: Rigetti & Co, LLC, Berkeley, CA (US)

(72) Inventor: Stefano Poletto, Orinda, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 485 days.

(21) Appl. No.: 18/160,521

(22) Filed: Jan. 27, 2023

Related U.S. Application Data

(60) Provisional application No. 63/303,809, filed on Jan. 27, 2022.

(51) Int. Cl.
*G06N 10/40* (2022.01)

(52) U.S. Cl.
CPC .................................. *G06N 10/40* (2022.01)

(58) Field of Classification Search
CPC ..................................................... G06N 10/40
See application file for complete search history.

(56) References Cited

U.S. PATENT DOCUMENTS 11,164,103 B2 * 11/2021 Bloom .................... G06N 10/70
2020/0274554 A1 * 8/2020 Aspuru-Guzik ....... G06N 10/20

OTHER PUBLICATIONS

Arute, et al., "Quantum supremacy using a programmable superconducting processor", Nature, 574, Oct. 24, 2019, 7 pgs.
Luthi, et al., "Evolution of Nanowire Transmons and Their Quantum Coherence in Magnetic Field", arXiv:1711.07961v1, Nov. 21, 2017, 13 pgs.
Troyer, "What Can We Do with a Quantum Computer?", https://www.microsoft.com/en-us/research/wp-content/uploads/2015/03/Matthias-Troyer_Quantum-applications.pdf, available as early as Jan. 22, 2022.
Versluis, et al., "Scalable Quantum Circuit and Control for a Superconducting Surface Code", Phys.Rev.App. 8, Sep. 25, 2017, 7 pgs.
Zajac, et al., "Spectator Errors in Tunable CouplingArchitectures", arXiv:2108.11221v1, Aug. 25, 2021, 5 pgs.

* cited by examiner

*Primary Examiner* — Joseph D Torres
(74) *Attorney, Agent, or Firm* — Henry Patent Law Firm PLLC

(57) ABSTRACT

In a general aspect, an augmented group of operations is calibrated for execution on a quantum processing unit. In some cases, a quantum program to be executed by a quantum processing unit is obtained. The quantum program includes a sequence of native quantum logic gates. A group of operations corresponding to a time step in the sequence is identified. The group of operations includes the native quantum logic gates that are applied to a first subset of qubits in parallel during the time step. An augmented group of operations is defined by adding single-qubit identity gates to the group. The single-qubit identity gates are applied to a second subset of qubits in parallel during the time step. A calibration process is performed over the first and second subsets of qubits to determine control parameters to execute the augmented group of operations on the quantum processing unit.

25 Claims, 12 Drawing Sheets

☐ : deactivated tunable-frequency coupler device

○ : qubit device where an added single-qubit identity gate is executed

● : qubit device where a native quantum logic gate is executed

□ : deactivated tunable-frequency coupler device

▨ : activated tunable-frequency coupler device

⋯ : tunable-frequency coupler device not critical

○ : qubit device where an added single-qubit identity gate is executed

● : qubit device where a native quantum logic gate is executed

○ : qubit device not critical

☐ : deactivated tunable-frequency coupler device
▨ : activated tunable-frequency coupler device
⋯ : tunable-frequency coupler device not critical
○ : qubit device where an added single-qubit identity gate is executed
● : qubit device where a native quantum logic gate is executed
○ : qubit device not critical

- ☐ : deactivated tunable-frequency coupler device
- ▓ : activated tunable-frequency coupler device
- ⌐ ¬ : tunable-frequency coupler device not critical
- ○ : qubit device where an added single-qubit identity gate is executed
- ● : qubit device where a native quantum logic gate is executed
- ○ (dashed) : qubit device not critical

CALIBRATING AN AUGMENTED GROUP OF OPERATIONS FOR EXECUTION ON A QUANTUM PROCESSING UNIT

CROSS-REFERENCE TO RELATED APPLICATIONS

This application claims priority to U.S. Provisional Patent Application No. 63/303,809, filed Jan. 27, 2022, entitled "Calibrating an Augmented Group of Operations for Execution on a Quantum Processing Unit." The above-referenced priority document is incorporated herein by reference in its entirety.

TECHNICAL FIELD

The following description relates to calibrating an augmented group of operations for execution on a quantum processing unit.

BACKGROUND

Quantum computers can perform computational tasks by storing and processing information within quantum states of quantum systems. For example, qubits (i.e., quantum bits) can be stored in, and represented by, an effective two-level sub-manifold of a quantum coherent physical system. A variety of physical systems have been proposed for quantum computing applications. Examples include superconducting circuits, trapped ions, spin systems, and others.

DETAILED DESCRIPTION

Figure 1:
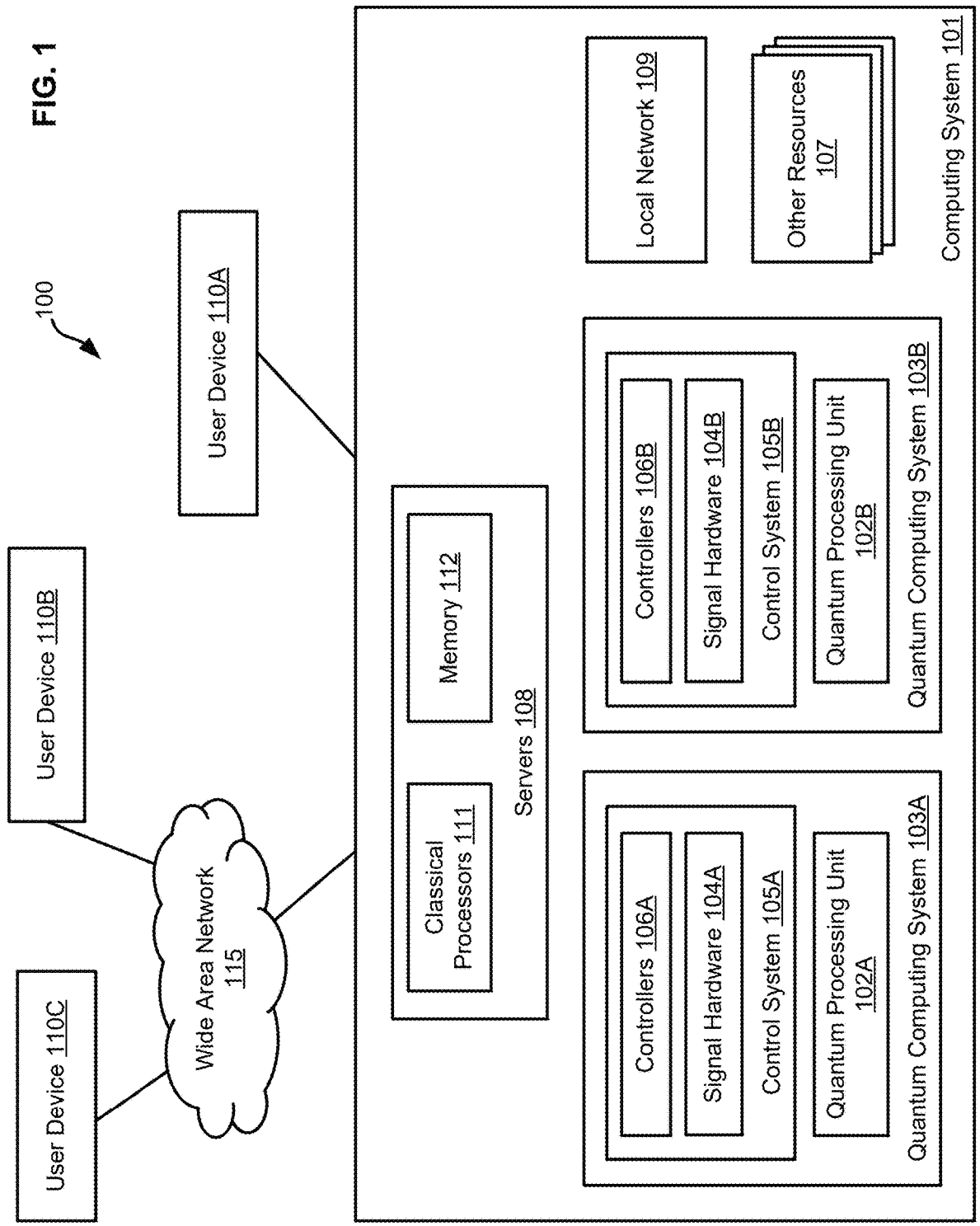
FIG. 1 is a block diagram of an example computing environment.

In some aspects of what is described here, an algorithm-dependent calibration process is performed in a quantum computing system. A control system identifies groups of operations in a quantum program and augments groups of operations to include additional operations. The augmented groups of operations are calibrated for execution on a quantum processing unit in the quantum computing system. The calibration process depends on the quantum logic gates in the quantum program and can be highly optimized for performing the quantum program. In some implementations, once a quantum program is created, generated, or otherwise received (e.g., as a user program), the quantum program is decomposed or compiled into hardware primitives, for example, quantum logic gate operations in a native program, that are specific to quantum circuit devices in a quantum processing unit of a quantum computing system where the native program is to be executed. In some instances, a quantum program may be generated as a random sequence of quantum logic gates, for example, in a quantum volume algorithm. In some instances, a quantum program, including quantum logic operations applied on logical qubits (e.g., a subarray of quantum circuit devices in a quantum processing unit), may be generated during a quantum error correction process.

The native quantum program includes a sequence of native quantum logic gates, e.g., single-qubit native quantum logic gates, two-qubit native quantum logic gates, multi-qubit native quantum logic gates, multi-level native quantum logic gates (e.g., qutrit or other qudits), and other types of quantum logic gates to execute the quantum program. To simplify description, a qubit, as referred to herein, may refer to a two-level qubit or any other higher-level system such as qutrits or any other qudit. In some implementations, the native quantum logic gates in the native quantum program that can be executed in parallel on separate quantum circuit devices or other distinct quantum computing resources can be identified and grouped together into groups of operations. The quantum program can include multiple groups of operations corresponding to different time steps in the quantum program. Each group of operations includes one or more native quantum logic gates applied on first qubits defined by first qubit devices of the quantum processing unit at a time step. In some implementations, each group of operations is augmented by adding single-qubit identity gates to the group, which are applied on second qubits defined by second, distinct qubit devices of the quantum processing unit. In some implementations, each augmented group of operations further includes control operations, e.g., delivering control signals to associated tunable-frequency coupler devices (e.g., in the same layer or across different layers of a 3-dimensional lattice) to deactivate couplings between the first and second qubit devices. After augmentation, each augmented group of operations includes the one or more native quantum logic gates, single-qubit identity gates, and control operations. The control operations can be configured to reduce, minimize or eliminate changes in the quantum states of the second qubit devices when the native quantum logic gates are executed. In some implementations, the control process determines control parameters of control signals that will be communicated to devices in the quantum processing unit to execute the native quantum logic gates on the first qubit devices. The control parameters are then stored and can be used when the quantum program is later executed in the quantum computing system.

In some implementations, the systems and techniques described here can provide technical advantages and improvements. The systems and techniques presented here provide a calibration process that can be optimized to a specific quantum program executed on a set of quantum computing resources in a quantum processing unit. The systems and techniques presented here can determine control parameters of control signals for performing operations of "active" operations (e.g., native quantum logic gates in an augmented group) and "spectator" operations (e.g., the added single-qubit identity gates and other control operations in the same augmented group). The systems and techniques presented here can improve a calibration process by mitigating flux crosstalk, reducing time needed for calibration (e.g., smaller variable-space), and improving gate performance (e.g., fidelity). In some implementations, when a quantum program is executed using the control parameters determined using the calibration processes described here, performance of the entire quantum program can be improved (in some cases, incurring only minimal or no extra cost). The systems and techniques presented here may be used in near term applications with noisy devices, for instance, to reach quantum advantage sooner. In some cases, a combination of these and potentially other advantages and improvements may be obtained.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109, and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer, or another type of high-performance computing resource, or in another manner. The computing system 101 or the user devices 110 may also have access to one or more other quantum computing systems (e.g., quantum computing resources that are accessible through the wide area network 115, the local network 109, or otherwise).

The user devices 110 shown in FIG. 1 may include one or more classical processors, memory, user interfaces, communication interfaces, and other components. For instance, the user devices 110 may be implemented as laptop computers, desktop computers, smartphones, tablets, or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B, and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B, and the other resources 107; the servers 108 can then send information to the user devices 110 based on output data from the computational tasks performed by the quantum computing systems 103A, 103B, and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115, and possibly other channels. In some implementations, the servers 108 may include a host server, an application server, a virtual server, or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random-access memory (RAM), a storage device (e.g., a writable read-only memory (ROM) or others), a hard disk, or another type of storage medium. The memory 112 can include various forms of volatile or non-volatile memory, media, and memory devices, etc.

Each of the example quantum computing systems 103A, 103B operates as a quantum computing resource in the computing system 101. The other resources 107 may include additional quantum computing resources (e.g., quantum computing systems, quantum virtual machines (QVMs), or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B, or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a quantum virtual machine, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or quantum virtual machines. In some cases, a program may be expressed in high-level terms of quantum logic gates or quantum programs, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may be expressed in another form or format.

In some cases, a quantum programs is provided as, or converted to, a native quantum program that contains only native quantum logic gates for a given quantum processing unit. The native quantum logic gates for a quantum processing unit are the quantum logic gates that can be directly executed on the quantum processing unit. For instance, the hardware of a quantum processing unit may naturally provide only certain classes of operations, and the quantum processing unit may define an instruction set architecture that permits only a limited subset of the quantum logic gates in a larger library of quantum machine instructions. As an example, the quantum processing unit 102A may require quantum logic gate operators that lie in $RZ(\theta)$, $RX(k*\pi/2)$, CZ and XY; and the quantum processing unit 102A may require quantum logic gates that act on physically available hardware (e.g., single-qubit gates that act on live qubits, or two-qubit gates that act on neighboring qubits). In this example, a gate is considered native if it is of the form of a single qubit Z-rotation ($RZ(\theta)$) for any value of the rotation angle $\theta$; a single qubit X-rotation ($RX(k*\pi/2)$) for any integer (k) number of $\pi/2$ rotations; a two-qubit controlled-Z gate (CZ) on a pair of qubits participating in a qubit-qubit interaction; or a two-qubit XY gate (XY) on a pair of qubits participating in a qubit-qubit interaction. In some contexts, it is desirable to write quantum programs that are not tied to a specific set of gates or instruction set architecture (e.g., to allow more portable code). Accordingly, the servers 108 may include a compiler that translates arbitrary quantum programs to native quantum programs (e.g., Quil to native Quil), which express the same quantum computing process in terms of the native gate set.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise). In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases, the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 104 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, the cloud-based QC environment is implemented using a resource such as, for example, OPENSTACK®. OPENSTACK® is an example of a software platform for cloud-based computing, which can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processing units 102A, 102B, and interact with a remote user device (110B or 110C) to provide a user programming environment. The QMI may operate in close physical proximity to, and have a low-latency communication link with, the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum virtual machines (QVMs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in, and represented by, an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices, and possibly other devices that are used to store and process quantum information. In some cases, the quantum processing unit 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processing unit 102A. In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

In some implementations, the example quantum processing unit 102A includes multiple quantum processor modules. For example, the quantum processing unit 102A may include a two-dimensional or three-dimensional array of quantum processor modules, and each quantum processor module may include an array of quantum circuit devices. In this case, the example quantum processing unit 102A is a modular quantum processing unit. In some cases, the quantum processor modules may be supported on a common substrate and may be connected through circuitry on the common substrate.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, and thermal shielding and cryogenic equipment can be used to maintain the system components at controlled temperature, etc.

In some implementations, the example quantum processing unit 102A can process quantum information by applying control signals to the quantum circuit devices in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic gates, can be applied to the qubits to perform a quantum program. The quantum program may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems, or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, cryogenic and on-chip signal generation devices, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic gates, readout operations, or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processing unit 102A to operate qubit devices, readout devices, bias devices, coupler devices, or other types of components in the quantum processing unit 102A.

In some instances, the signal hardware 104A receives and processes signals from the quantum processing unit 102A. The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers, and other types of components. In some instances, the signal delivery hardware performs preprocessing, signal conditioning, or other operations to the control signals to be delivered to the quantum processing unit 102A. In some instances, signal delivery hardware performs preprocessing, signal conditioning, or other operations on readout signals received from the quantum processing unit 102A.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitstrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

In some cases, the control system 105 includes one or more digital computers or digital computing components that produce a control sequence, for instance, based on a quantum program. For example, a digital processor may convert a quantum program (e.g., instructions written in the Quil programming language) to an instruction set for the native gate set or architecture of the quantum processing unit 102. The quantum program may be generated locally by compiling a user program, received from a remote system, or obtained in another manner.

In some implementations, the series of native quantum logic gates in a compiled quantum program includes one or more parametric gates. For instance, the series of native quantum logic gates may generally include any type of single-qubit parametric rotation, any type of two-qubit parametric interaction, a controlled (or a controlled-controlled) single-qubit parametric rotation, a controlled (or a controlled-controlled) two-qubit parametric interaction, or another type of parametric quantum logic gate. In some cases, the series of native quantum logic gates in the compiled quantum program also includes non-parametric gates.

In some aspects of operation, the compiler receives a source quantum program that includes a first quantum logic gate, for example, within a larger quantum logic circuit specified in the source quantum program. The compiler generates a native quantum program that corresponds to the source quantum program and is configured for a target quantum processing unit. In certain examples, the native quantum program is a binary quantum program formatted for execution by control electronics associated with the target quantum processing unit. In some cases, the native quantum program can be an updated version of the source quantum program, for example, that expresses the quantum logic circuit in terms of a native gate set of the target quantum processing unit. To generate the native quantum program, the compiler identifies a series of native quantum logic gates that are logically equivalent to the first quantum logic gate in the source quantum program (e.g., the series corresponds to the same unitary operation, up to a global phase). In some instances, the series of native quantum logic gates (in the native quantum program) are selected from the native gate set of the target quantum processing unit. In some instances, the compiler obtains the series of native quantum logic gates from a library of quantum logic circuits. In some examples, the compiler generates the series of native quantum logic gates by executing a parametric decomposition process. For example, an arbitrary two-qubit quantum logic gate in a source quantum program can be compiled with some fixed set of native entangling gates. Any arbitrary two-qubit quantum logic gate can be expressed with at most 3 controlled-Zs (CZs) or 3 iSWAPs in addition to single-qubit rotations. In some implementations, after obtaining the native quantum program, the control system 105 organizes the native quantum program by identifying groups of operations, each of which contains native quantum logic gates that can be executed in parallel during a time step in the native quantum program (e.g., as described with respect to operation 304 in the example process 300 of FIG. 3). The native quantum program can then be organized by augmenting each group of operations, e.g., adding single-qubit identity gates and other control operations that can be executed in parallel with the native quantum logic gates during the same time step. An "identity gate," as used herein, may refer to a native gate supported by the quantum circuit device that is applied on a single qubit and results in basis state for that qubit to remain unchanged. The identity gate can represent a "no operation" or "no-op" gate.

In some instances, the control system 105 can implement a device measurement process on a quantum circuit device and interpret the measurements to extract device parameters. The device parameters can be physical attributes of the device, for example, the resonance frequency between the two lowest energy levels of a qubit. When a calibration process is used to determine control parameters for quantum logic gates, initial values of the control parameters can be then determined by the control system 105 according to the device parameters. When a different set of qubits is selected, the initial values of the control parameters to operate quantum logic gates can be different. In some instances, a calibration process (e.g., the calibration process 306 in FIG. 3) to determine improved or optimal values of the control parameters (e.g., starting from the initial values of the control parameters as initial conditions) can be performed by operation of the control system 105. Accurate determination of the values of the control parameters can be important, for example, to enable operation of the quantum computing system 100 with a desired performance.

Figure 2:
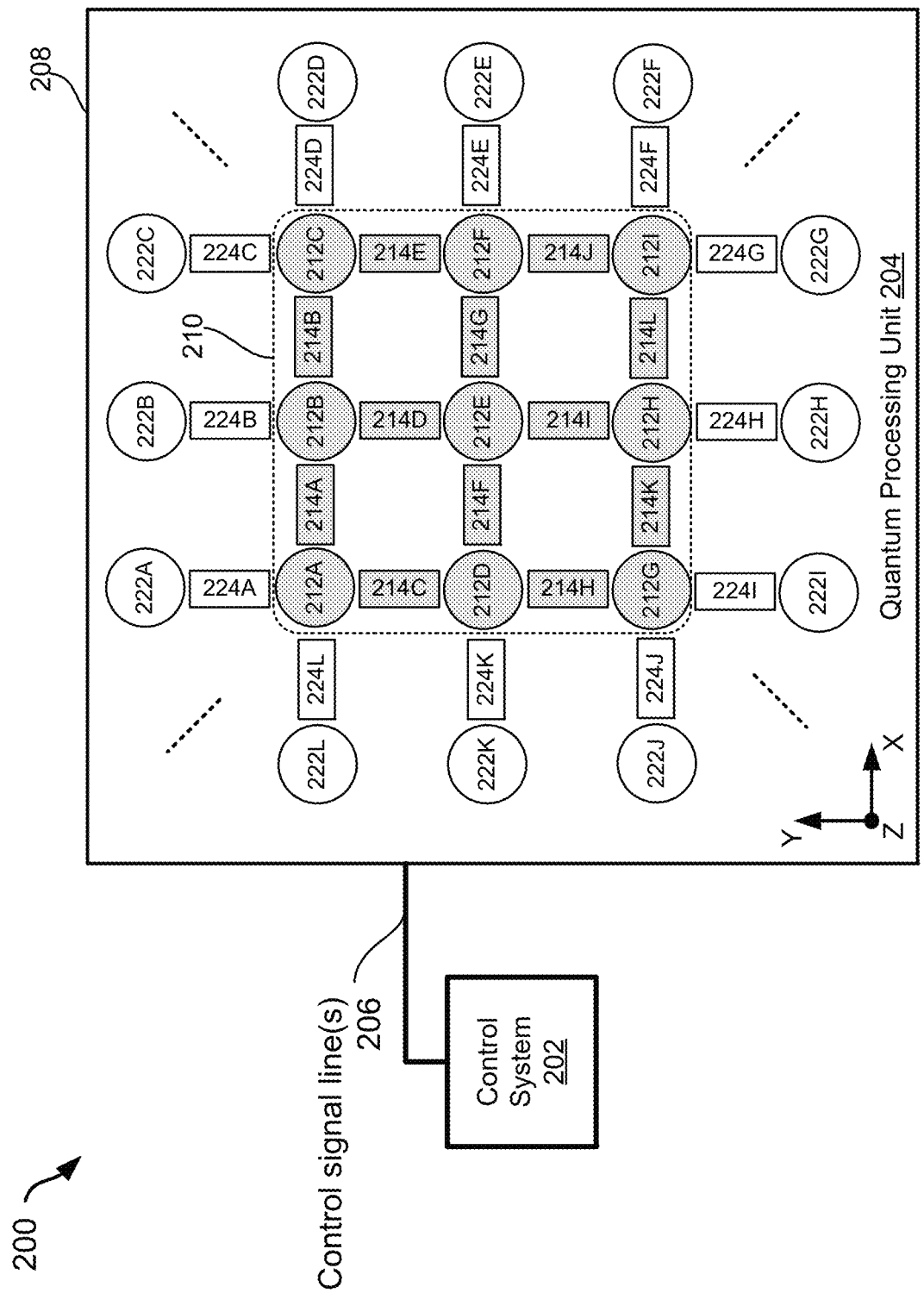
FIG. 2 is a schematic diagram showing aspects of an example quantum computing system.

FIG. 2 is a schematic diagram showing aspects of an example quantum computing system 200. The example quantum computing system 200 shown in FIG. 2 may be deployed as one or more of the quantum computing systems (e.g., 103A, 103B) shown in FIG. 1, or the quantum computing system 200 may be deployed in another type of computing environment. As shown in FIG. 2, the example quantum computing system 200 includes a control system 202 and a quantum processing unit 204. The example quantum processing unit 204 may be implemented as the quantum processing unit 102 in FIG. 1. The example quantum computing system 200 may include additional or different features, and the components may be arranged in another manner.

As shown in FIG. 2, the example quantum processing unit 204 includes a device array, which includes superconducting quantum circuit devices arranged in a two-dimensional layout. Forty-five of the superconducting quantum circuit devices in the device array are shown in FIG. 2. In particular, the example quantum processing unit 204 includes twenty-one qubit devices 212, 222 (e.g., labeled as filled and unfilled circles) and twenty-four coupler devices 214, 224 (e.g., labeled as filled and unfilled rectangles). The qubit devices 212, 222 may be implemented as tunable-frequency transmon qubit devices, flux qubit devices, flatsonium qubit devices, fluxonium qubit devices, or other types of tunable-frequency qubit devices. The qubit devices 212, 222 may be implemented as fixed-frequency qubit devices or tunable-frequency qubit devices. The coupler devices 214, 224 may be implemented as fixed-frequency coupler devices, tunable-frequency coupler devices, or other types of coupler devices. In some implementations, the example quantum processing unit 204 shown in FIG. 2 is part (e.g., a two-dimensional grid on one layer) of a three-dimensional lattice, which includes multiple layers of two-dimensional grids shown in FIG. 2. A coupling between two qubit devices from two distinct layers may be achieved by a static capacitive coupling, a tunable-frequency coupling, or other types of coupling.

In the example shown in FIG. 2, the quantum circuit devices are arranged in a rectilinear (e.g., rectangular or square) array that extends in two spatial dimensions (in the plane of the page), and each of the qubit devices 212A-I has four coupler devices which enable the coupling with four other nearest-neighbor tunable-frequency qubit devices. For example, the qubit device 212E is coupled with the qubit devices 212B, 212D, 212H, and 212F through the coupler devices 214D, 214F, 214I, and 214G, respectively. In other words, four coupler devices 214D, 214F, 214I, and 214G are associated with the qubit device 212E (e.g., a connectivity of the qubit device 212E is 4 in this case). In some implementations, the devices can be arranged in another type of ordered array. In some instances, the rectilinear array also extends in a third spatial dimension (in/out of the page), for example, to form a cubic array or another type of three-dimensional array. In this case, a qubit device may have a higher connectivity according to the number of the associated coupler devices. For example, the qubit device 212E may include additional coupler devices configured to provide coupling with other qubit devices residing at different layers of a three-dimensional lattice.

In some aspects, parametrically activated quantum logic gates are supported in a two-dimensional or three-dimensional architecture (e.g., an architecture where quantum circuit devices are distributed over two or three spatial dimensions). For instance, the positions of the qubit devices within the example quantum processing unit 204 may define one or more two-dimensional spatial arrays in a plane, and readout resonators associated with the qubit devices can be positioned within another plane (e.g., on another processor substrate). In some cases, qubit devices 212, 222 on one substrate 208 are electronically coupled to readout resonators on another substrate through conductive signal vias, interconnections, cap wafers, or other types of structures. Accordingly, frequency allocation schemes can be defined for two-dimensional and three-dimensional processor architectures.

In some implementations, the control system 202 interfaces with the quantum processing unit 204 through signal hardware that includes control signal lines 206. The control system 202 and control signal lines 206 may be implemented, for example, as described with respect to the controller 106 and the signal hardware 104 of the example control system 105 shown in FIG. 1, or in another manner.

In the example quantum processing unit 204 shown in FIG. 2, each of the qubit devices 212, 222 can be encoded with a single bit of quantum information (a qubit). Each of the qubit devices has two eigenstates that are used as computational basis states, and each qubit device can transition between its computational basis states or exist in an arbitrary superposition of its computational basis states. In some examples, two lowest energy levels (e.g., the ground state |0⟩ and a first excited state |1⟩) of each qubit device are defined as a qubit and used as computational basis states for quantum computation. In some examples, higher energy levels (e.g., a second excited state |2⟩ or a third excited state |3⟩) are also defined by a multi-state quantum circuit device, and may be used for quantum computation in some instances.

In some implementations, the qubits of the respective qubit devices can be manipulated by control signals, or read by readout signals, generated by the control system 202. The qubit devices can be controlled individually, for example, by communicating control signals to the respective qubit devices. In some cases, a coupler device may be a tunable-frequency coupler device. In this case, the coupling between two qubit devices can be activated or deactivated by tuning the transition frequency of the associated tunable-frequency coupler device. Control signals can be communicated to the qubit devices and the associated tunable-frequency coupler device. In some implementations, associated tunable-frequency coupler devices includes those that are in the same layer or between different layers in a three-dimensional lattice. In some cases, readout devices can detect the qubits of the qubit devices, for example, by interacting directly with the respective qubit devices.

In some examples, a tunable-frequency qubit device includes a superconducting circuit loop (e.g., a SQUID loop) that receives a magnetic flux which can tune the transition frequency of the tunable-frequency qubit device. In some instances, the transition frequency can be tuned within a range of frequencies (e.g., between a maximum transition frequency and a minimum transition frequency). The superconducting circuit loop may include two Josephson junctions, and the tunable-frequency qubit device may also include a shunt capacitor connected in parallel with each of the two Josephson junctions. In certain instances, the energy difference E between any two adjacent energy levels in a qubit device can be represented as a transition frequency $\omega$ of the qubit device (e.g., according to $\omega=E/h$). In some examples, a transition frequency is tunable, for example, by application of a magnetic flux. In this case, the transition frequency may be defined at least in part by Josephson energies of the two Josephson junctions, a capacitance of the shunt capacitor, and a magnetic flux threading the superconducting circuit loop. A qubit operating frequency of the tunable-frequency qubit device is a transition frequency at which the tunable-frequency qubit device operates.

In some implementations, a tunable-frequency qubit device includes a nanowire device. In some instances, the nanowire device can be capacitively coupled to an adjacent control signal line which can tune the transition frequency of the tunable-frequency qubit device. In this case, the tunable-frequency qubit device is capacitively biased. In some instances, a tunable-frequency qubit device may include other circuit components and a transition frequency of the tunable-frequency qubit device may be controlled in another manner.

In the example shown in FIG. 2, each qubit device 212, 222 has one or more tunable transition frequencies. In some cases, the transition frequencies of the tunable-frequency qubit devices can be tuned by applying respective offset fields to the respective tunable-frequency qubit devices. Each of the offset field can be, for example, a magnetic flux bias, a DC electrical voltage, or another type of field.

In some instances, information is encoded in the qubit devices 212, 222 in the quantum processing unit 204, and the information can be processed by operation of the qubit devices 212, 222. For instance, input information can be encoded in the computational states or computational subspaces defined by some or all of the qubit devices in the quantum processing unit 204. The information can be processed, for example, by applying a quantum program or other operations to the input information. The quantum program may be decomposed as a sequence of native quantum logic gates or instruction sets that are executed by quantum circuit devices in the quantum processing unit 204 over a series of clock cycles. In some cases, information is processed in another manner. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations.

As shown in FIG. 2, the control system 202 is coupled to each of the superconducting quantum circuit devices (e.g., the qubit devices 212, 222 and the tunable-frequency coupler devices 214, 224) in the quantum processing unit 204 through one or more control signal lines 206. For example, the control system 202 may communicate control signals to and receive readout signals from the quantum processing unit 204. The control signals communicated from the control system 202 to the qubit devices 212, 222 can be configured to modulate, increase, decrease, or otherwise manipulate the qubit operating frequencies of the qubit devices 212, 222. For example, a control signal may include a flux bias signal to tune the transition frequency of the tunable-frequency qubit device. For another example, a control signal may include a flux modulation signal that modulates a magnetic flux experienced by the tunable-frequency qubit device, and thus the transition frequency of the tunable-frequency qubit device. In some implementations, a control signal can be a direct current (DC) signal, an alternating current (AC) signal (e.g., superposed with a DC signal) communicated from the control system 202 to a qubit device. Other types of control signals may be used.

In some cases, the control signal lines 206 may include a flux bias device or another type of flux bias element that is inductively coupled to the superconducting circuit loop of a tunable-frequency qubit device to control the magnetic flux through a superconducting circuit loop in the tunable-frequency qubit device. The control signal may cause the flux-bias device to modulate the magnetic flux at a modulation frequency. In some instances, the modulation frequency of the magnetic flux may be the same as the flux modulation frequency om of the flux modulation signal, or the modulation frequency of the magnetic flux may have a different value.

In some implementations, a transition frequency ($\omega_T$) of a tunable-frequency qubit device can be tuned by tuning a magnetic flux threading a superconducting circuit loop in the tunable-frequency qubit device. A magnetic flux can be modulated by communicating a flux modulation signal from the control system 202 to a flux bias element in a flux bias control line. Consequently, the transition frequency $\omega_T$ of the tunable-frequency qubit device can be modulated. In some instances, a flux modulation signal includes a flux modulation frequency ($\omega_m$) causing the transition frequency $\omega_T$ of a tunable-frequency qubit device to oscillate at a harmonic of the flux modulation frequency $\omega_m$. In some instances, the transition frequency $\omega_T$ under modulation is in a range of qubit operation frequencies which is defined by a tunability of a tunable-frequency qubit device. In some instances, a control signal may include a qubit drive signal which can drive the transition between two energy states (e.g., between the ground state and the first excited state) causing a population exchange between the ground state and the excited state. In some instances, a flux modulation signal that includes components at multiple modulation frequencies may be used.

In some implementations, control signals for a tunable-frequency qubit device including a flux modulation signal and a qubit drive signal can be communicated to the tunable-frequency qubit device on two separate control signal lines, e.g., a flux bias control line and a qubit drive control line. In some instances, the flux bias control line can be inductively coupled to the superconducting circuit loop to control the magnetic flux and thereby control the transition frequencies of the tunable-frequency qubit device. In certain examples, the qubit drive control line can be capacitively coupled to the tunable-frequency qubit device, e.g., through one or more qubit electrodes of the tunable-frequency qubit device. In this case, when a qubit drive signal and a flux modulation signal are communicated to the tunable-frequency qubit device through the respective control signal lines, a single-qubit quantum logic gate can be applied to a qubit defined by the tunable-frequency qubit device. In some instances, the flux modulation signal and the qubit drive signal may be communicated on a single control signal line that is both inductively and capacitively coupled to the tunable-frequency qubit device. In some instances, the transition frequency of the tunable-frequency qubit device or the tunable-frequency coupler device may be controlled in another manner. For example, when the tunable-frequency coupler device 214 is implemented as a transmon device with a Josephson junction replaced by a nanowire device, the transition frequency of the transmon device can be controlled capacitively using a voltage signal communicated on a control signal line associated with the nanowire device.

In some implementations, initial values of control parameters of control signals, e.g., the flux bias amplitude, the flux modulation frequency @m, the flux modulation amplitude 80, the duration of the interaction produced by the flux modulation signal, or other control parameters of other control signals are determined based on the device parameters, e.g., transition frequencies, anharmonicities, data from a calibration or other test procedure, or a combination of these and other information.

In some cases, the control system 202 may execute a device measurement process, e.g., when the quantum processing unit 204 is first installed for use in the quantum computing system 200, and the device measurement process may be repeated at other times (e.g., as needed, periodically, according to a calibration schedule, etc.). For instance, a device measurement module may execute a measurement process that obtains device parameters of the quantum circuit devices in the quantum processing unit 204. The device parameters may be obtained by the device measurement process, for example, based on measurements of the quantum processing unit 204, based on a circuit specification of the quantum processing unit 204, based on analytical or numerical calculations, or otherwise. The device parameters may include, for example, qubit frequencies (e.g., a tunable range) and an anharmonicity for each tunable-frequency qubit device. In some instances, device parameters of the superconducting quantum circuit devices obtained from the device measurement process may be stored in a database, which can be used for determining initial values of control parameters of control signals to execute quantum logic gates on respective quantum circuit devices in the quantum processing unit 204.

In some implementations, the control system 202, or another type of system associated with the quantum computing system 200, further determines improved or optimal values of the control parameters of the control signals for executing quantum logic gates on respective quantum circuit devices in the quantum processing unit 204. For example, the improved or optimal values of the control parameters may be determined by performing an algorithm-dependent calibration process defined in software, firmware or hardware, or a combination thereof. In some cases, the calibration process can be performed by executing some or all of the operations in the example process 300 of FIG. 3 or in another manner.

In some instances, when a quantum program is defined and received by a computing system, a subset of superconducting quantum circuit devices of the quantum processing unit 202 can be selected for performing the quantum program, for example, by operation of the server 108 of the computing system 101 in FIG. 1. As shown in FIG. 2, an example island 210 of quantum circuit devices are selected for performing a quantum program. The example island 210 includes nine qubit devices 212 (e.g., 212A, 212B, 212C, 212D, 212E, 212F, 212G, 212H, and 212I labeled as filled circles within the boundary of the island 210) and twelve associated coupler devices 214 (e.g., 214A, 214B, 214C, 214D, 214E, 214F, 214G, 214H, 214I, 214J, 214K, and 214L labeled as filed rectangles within the boundary of the island 210).

In some implementations, an algorithm-dependent calibration process is determined after a quantum program is defined and received. In this case, the algorithm-dependent calibration process is determined according to the quantum logic gates in the quantum program and can be optimized for performing the quantum program. In some implementations, the selected superconducting quantum circuit devices within the boundary of the island 210 (e.g., the qubit devices 212A, 212B, 212C, 212D, 212E, 212F, 212G, 212H, and 212I and the tunable-frequency coupler devices 214A, 214B, 214C, 214D, 214E, 214F, 214G, 214H, 214I, 214J, 214K, and 214L) for performing the quantum logic gates in the quantum program can be measured to obtain device parameters. In some instances, quantum circuit devices out of the boundary of the island 210 and operably coupled to the quantum circuit devices within the island 210 can be also measured. In some instances, device parameters of the selected quantum circuit devices can be pre-determined and obtained from a database. In some instances, the device parameters of quantum circuit devices may include, a transition frequency of a fixed-frequency qubit device, a range of transition frequencies of a qubit device, anharmonicity, a parking value and a gate-activating value of a transition frequency of a tunable-frequency coupler device to activate and deactivate the coupling between two qubit devices, or other devices parameters. In some implementations, device parameters are used for determining initial values of the control parameters of the control signal in a gate optimization process for determining the optimized control parameters. The values of the control parameters, determined during the algorithm-dependent calibration process, are then stored in a database and used when the quantum program is executed.

In some instances, multiple subsets of quantum circuit devices can be selected in the same quantum processing unit 204, to run multiple quantum programs simultaneously or in parallel. In some instances, a quantum program may select multiple subsets of quantum circuit devices from a quantum processing unit. Each of the subsets may include multiple qubit devices collectively working together to define a single logical qubit. In these cases, algorithm-dependent calibration processes (e.g., the example process 300 in FIG. 3) may be performed in parallel on all the subsets of quantum circuit devices. In certain instances, a quantum program can be executed on a modular quantum processing unit which includes multiple quantum processor modules. In this case, the algorithm-dependent calibration process (e.g., the example process 300 in FIG. 3) can be performed on each of the multiple quantum processor modules. Additionally or alternatively, separate "cores" of qubits on the multiple quantum processor modules can be formed and the algorithm-dependent calibration process (e.g., the example process 300 in FIG. 3) can be performed on each of the multiple cores.

In some implementations, a native quantum program can be organized into multiple groups of operations, each of which includes native quantum logic gates that are executed in parallel at a time step in the native quantum program. The groups of operations are then augmented by adding single-qubit identity gates to form augmented groups of operations. In this case, the added single-qubit identity gates and the native quantum logic gates of the same augmented group of operations are executed in parallel at a respective time step in the native quantum program. Control parameters of control signals communicated to qubit devices on which the native quantum logic gates are executed can be determined, when the augmented group of operations is executed during a calibration process.

In some instances, other control parameters of control signals communicated to quantum circuit devices that are not selected for performing the quantum program, e.g., the qubit devices 222 and the coupler devices 224, can be also determined in the calibration process. For example, when the quantum program is performed on a majority of quantum circuit devices in the example quantum processing unit, control parameters of control signals communicated to the coupler device 224B to deactivate the coupling between the qubit device 212B and the qubit device 222B, and control parameters of control signals communicated to the qubit device 222B to execute a single-qubit identity gate can be determined. For another example, when the quantum program is performed on a small portion of quantum circuit devices in the example quantum processing unit, control parameters applied on the coupler device 224B to deactivate the coupling between the qubit device 212B and the qubit device 222B, can be determined.

The example quantum processing unit 204 shown in FIG. 2 resides on the top surface of a substrate 208. In certain instances, the substrate 208 may be an elemental semiconductor, for example silicon (Si), germanium (Ge), selenium (Se), tellurium (Te), or another elemental semiconductor. In some instances, the substrate 402 may also include a compound semiconductor such as aluminum oxide (sapphire), silicon carbide (SiC), gallium arsenic (GaAs), indium arsenide (InAs), indium phosphide (InP), silicon germanium (SiGe), silicon germanium carbide (SiGeC), gallium arsenic phosphide (GaAsP), gallium indium phosphide (GaInP), or another compound semiconductor. In some instances, the substrate 208 may also include a superlattice with elemental or compound semiconductor layers. In certain instances, the substrate 208 includes an epitaxial layer. In some examples, the substrate 208 may have an epitaxial layer overlying a bulk semiconductor or may include a semiconductor-on-insulator (SOI) structure.

The qubit electrodes and the ground plane include superconductive materials and can be formed by patterning one or more superconductive (e.g. superconducting metal) layers or other materials on the surface of the substrate 208. In some implementations, each of the one or more superconductive layers include a superconducting metal, such as aluminum (Al), niobium (Nb), tantalum (Ta), titanium (Ti), vanadium (V), tungsten (W), zirconium (Zr), or another superconducting metal. In some implementations, each of the one or more superconductive layers may include a superconducting metal alloy, such as molybdenum-rhenium (Mo/Re), niobium-tin (Nb/Sn), or another superconducting metal alloy. In some implementations, each of the superconductive layers may include a superconducting compound material, including superconducting metal nitrides and superconducting metal oxides, such as titanium-nitride (TiN), niobium-nitride (NbN), zirconium-nitride (ZrN), hafnium-nitride (HfN), vanadium-nitride (VN), tantalum-nitride (TaN), molybdenum-nitride (MoN), yttrium barium copper oxide (Y—Ba—Cu—O), or another superconducting compound material. In some instances, the qubit electrodes and the ground plane may include multilayer superconductor-insulator heterostructures.

In some implementations, the qubit electrodes and the ground plane are fabricated on the top surface of the substrate 208 and patterned using a microfabrication process or in another manner. For example, the qubit electrodes and the ground plane may be formed by performing at least some of the following fabrication steps: using chemical vapor deposition (CVD), physical vapor deposition (PVD), atomic layer deposition (ALD), spin-on coating, and/or other suitable techniques to deposit respective superconducting layers on the substrate 208; and performing one or more patterning processes (e.g., a lithography process, a dry/wet etching process, a soft/hard baking process, a cleaning process, etc.) to form openings in the respective superconducting layers.

Figure 3:
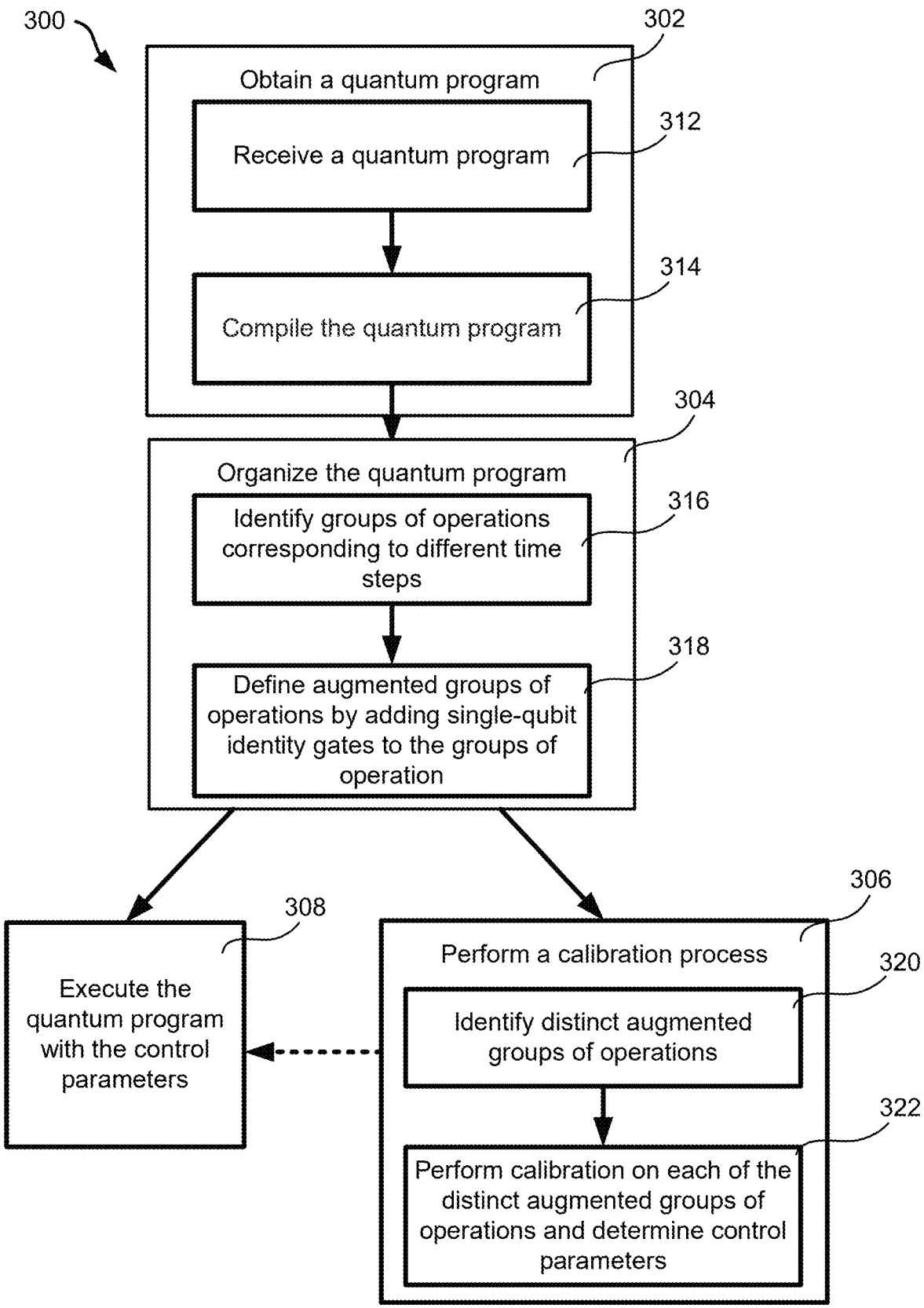
FIG. 3 is a flow chart showing aspects of an example process for calibrating an augmented group of operations for execution on a quantum processing unit.

FIG. 3 is a flow chart showing aspects of an example process 300 for calibrating an augmented group of operations to be executed on a quantum processing unit. The example process 300 can be implemented as an algorithm-dependent highly optimized calibration (AdHoc) process performed in a quantum computing system. The example process 300 can be used, for example, to operate a quantum processing unit, e.g., the quantum processing unit 204 in FIG. 2. For instance, the example process 300 can be used to perform a gate optimization process for a quantum program. In certain instances, the example process 300 can be used for determining improved or optimal values of control parameters of control signals applied to quantum circuit devices in a quantum processing unit when the quantum program is executed. The example process 300 may include additional or different operations, including operations performed by additional or different quantum circuit devices, and the operations may be performed in the order shown or in another order.

In some implementations, one or more operations in the example process 300 can be performed by a computer system, for instance, by a digital computer system having one or more digital processors (e.g., a microprocessor or other data processing apparatus) that execute instructions (e.g., instructions stored in a digital memory or other computer-readable medium), or by another type of digital, quantum or hybrid computer system. As an example, in some cases the quantum processing unit can be deployed as the quantum processing unit 102 shown in FIG. 1, and operations in the example process 300 shown in FIG. 3 can be initiated, executed, or controlled by one or more components of the control system 105 shown in FIG. 1.

At 302, a quantum program is obtained. In some implementations, the quantum program is obtained by performing a compilation operation on a received quantum program from a user (e.g., a user program). A sequence of quantum logic gates in the quantum program before compilation can be converted to a sequence of native quantum logic gates in the quantum program after compilation. In some instances, the sequence of native quantum logic gates can be applied on qubits defined by qubit devices in the quantum processing unit. In some implementations, the operation 302 includes sub-operations 312 and 314.

At 312, a quantum program is received. In some implementations, a quantum program can be represented, for example, as a quantum Hamiltonian, a sequence of quantum logic gates, a set of quantum machine instructions, or otherwise. The quantum program may correspond to a computational task, a hardware test, a quantum error correction procedure, a quantum state distillation procedure, or a combination of these and other types of operations. In some instances, a quantum program includes a first sequence of quantum logic gates, e.g., single-qubit quantum logic gates, two-qubit quantum logic gates, multi-qubit quantum logic gates, identity gates, and other quantum logic gates. In some instances, the quantum program can be an Quil program generated by a user device (e.g., the user device 110 as shown in FIG. 1), another computer resource outside the local environment of the quantum computer system 103, or in another manner; and received by a quantum computing system (e.g., the control system 105 of the quantum computing system 103 in FIG. 1).

At 314, the received quantum program is compiled. In some implementations, the received quantum program is compiled according to the particular quantum computing system where the quantum program is to be executed. In this case, after compilation, the quantum program includes quantum logic gates that can be executed on quantum circuit devices in a quantum processing unit (e.g., the qubit devices 212 and the associated coupler devices 214 in the quantum processing unit 204 as shown in FIG. 2). In some implementations, the quantum program can be compiled by operation of a compiler after receiving the quantum program.

In some instances, a native gate set includes a set of quantum logic gates that can be directly executed by the quantum processing unit. After a native gate set for the quantum processing unit is identified, a quantum logic gate in the first sequence of quantum logic gates (e.g., one or more parametric quantum logic gates) in the quantum program can be converted, translated, or otherwise compiled into a native gate sequence in a second sequence of quantum logic gates. Each of the native quantum logic gates in a native gate sequence may be a parametric single-qubit rotation gate, a parametric two-qubit quantum logic gate, a parametric three-qubit quantum logic gate, or another quantum logic gate. In addition to the parametric quantum logic gates, a native gate set may include one or more non-parametric quantum logic gates. For example, a two-qubit quantum logic gate, e.g., CNOT gate, in a received quantum program from a user can be decomposed into several iSWAP gates or a CZ gate that can be directly executed on quantum circuit devices in a quantum processing unit.

When the quantum program before compilation includes more than one quantum logic gates, more than one native gate sequences can be formed, e.g., by parametric decomposition or in another manner. Generally, the one or more native gate sequences are quantum-logically equivalent to the respective one or more quantum logic gates in the quantum program before compilation.

In some instances, the quantum program after compilation can be further improved. For example, the second sequence of quantum logic gates can be rearranged to reduce count of native quantum logic gates (e.g., gate counts), reduce parallel circuit depth, time steps, and other quantum logic circuit parameters to reduce run time or improve another performance.

At 304, the quantum program is organized. During operation 304, native quantum logic gates in the second sequence that can be performed simultaneously with one another are determined and grouped together to form a group of operations. In some implementations, a quantum program after organization includes multiple groups of operations (e.g., the groups 402, 404, 406, 408, 410 in the example quantum logic circuit 400 shown in FIG. 4A). Each group of operations in the organized quantum program includes operations (e.g., native quantum logic gates) that can be performed in parallel at a time step in the second sequence. In some implementations, single-qubit identity gates (e.g., the added single-qubit identity gates 422 in the groups 432, 434, 436, 438 in the example quantum logic circuit 400 shown in FIG. 4B) are added to each of the groups according to one or more predetermined criteria. In this case, an augmented group of operations is defined. For example, a group of operations may include native quantum logic gates that are applied on a first subset of qubits defined by first qubit devices in a quantum processing unit. In some implementations, single-qubit identity gates are applied on a second subset of qubits defined by second qubit devices. The single-qubit identity gates can be configured to make sure that the quantum states of the second qubit devices are not changed or that the change of the quantum states are within a predetermined threshold value (e.g., a threshold gate fidelity or another parameter), when the native quantum logic gates in the same group are performed in parallel during the time step.

Figure 5A:
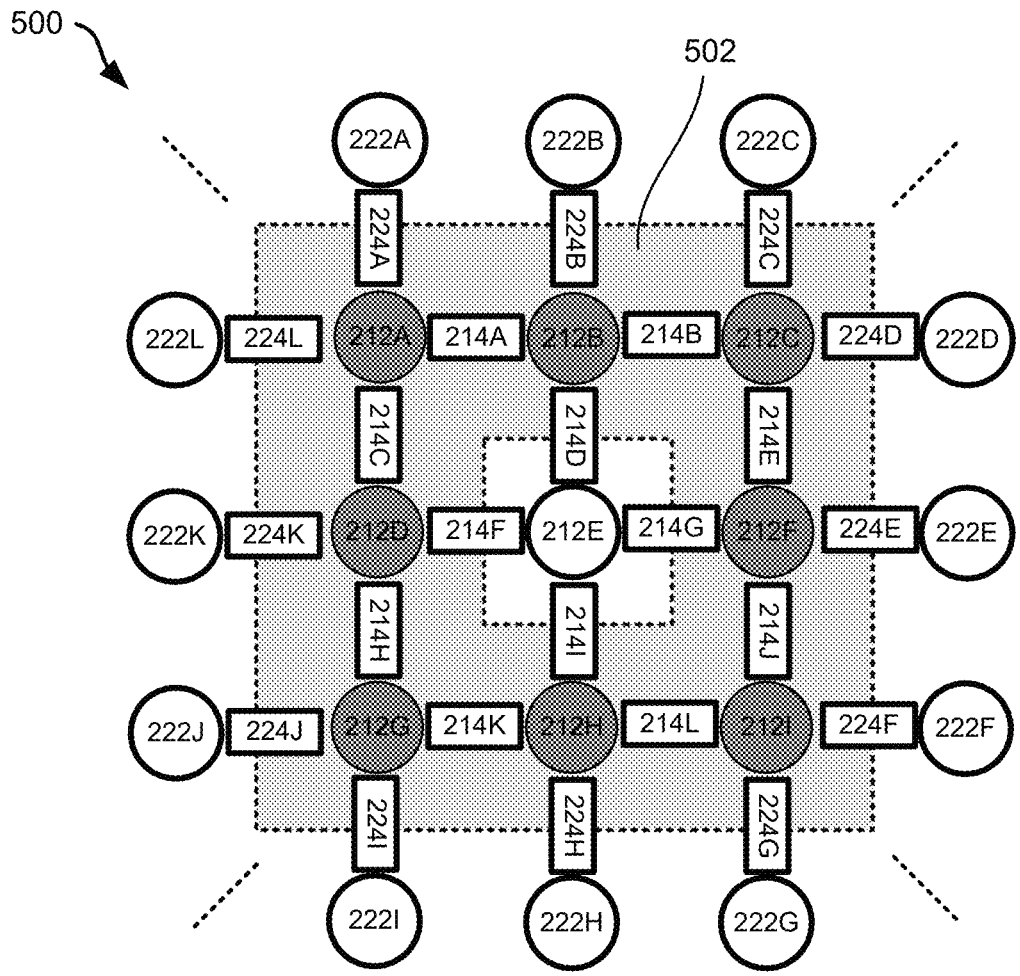
FIGS. 5A-5D are schematic diagrams showing aspects of the example quantum processing unit in FIG. 2 when respective groups of operations in the example quantum logic circuit in FIG. 4B are executed in parallel.

In some implementations, in addition to the single-qubit identity gates applied on the second subset of qubits, an augmented group of operation is also defined by adding control operations. For example, control operations can be applied on selected coupler devices (e.g., the deactivated tunable-frequency coupler devices 214 and 224 as shown in FIG. 5A) to decouple the second qubit devices (e.g., the qubit devices out of the islands 502, 512, 522, 532 as shown in FIGS. 5A, 5B, 5C, 5D) from the first qubit devices (e.g., the qubit devices within the islands 502, 512, 522, 532 as shown in FIGS. 5A, 5B, 5C, 5D), where the native quantum logic gates in the augmented group of operations are executed. In some instances, control operations can be applied on other types of quantum circuit devices. As such, after operation 304, the augmented group of operations includes native quantum logic gates, single-qubit identity gates, and control operations. After operation 304, the second sequence of quantum logic gates has been converted to a third sequence of quantum logic gates with the added single-qubit identity gates and the added control operations. The native quantum logic gates, the added single-qubit identity gates, and the added control operations in the same augmented group of operations are executed in parallel during a time step in the third sequence. In the example shown in FIG. 3, operation 304 includes sub-operations 316 and 318.

At 316, the native quantum logic gates that can be performed in parallel at a time step in the second sequence of quantum logic gates are identified and grouped together to form a group of operations. In some implementations, in order to identify native quantum logic gates that can be performed in parallel during a time step, different criteria can be applied. For example, a criterion may specify that single-qubit native quantum logic gates and two-qubit native quantum logic gates are not in the same groups of operations. In this example, a group of operations may include native quantum logic gates that operate on the same number of qubits (e.g., single-qubit native quantum logic gates, two-qubit native quantum logic gates, or another type of native quantum logic gates). For another example, a criterion may specify that two-qubit native quantum logic gates in a group of operations do not apply to qubits defined by the same qubit devices. In some instances, native quantum logic gates that can be grouped together into one group of operations are determined with an objective to maximize the number of native quantum logic gates that can be performed in parallel to reduce execution time. In certain instances, a group of operations are determined under other objectives. In some implementations, a quantum program includes multiple groups of operations; and each group of operations includes native quantum logic gates that are applied to distinct qubits defined by distinct qubit devices in a quantum processing unit. The native quantum logic gates within the same group are executed in parallel during a time step in the second sequence.

Using the quantum processing unit 204 in an example, a quantum program includes a first two-qubit native quantum logic gate, a second two-qubit native quantum logic gate, and a third two-qubit native quantum gate. The first two-qubit native quantum logic gate is performed on the qubit devices 212B, 212E and the associated tunable-frequency coupler device 214D; the second two-qubit native quantum logic gate is performed on the qubit devices 212E, 212H and the associated tunable-frequency coupler device 214I; and the third two-qubit native quantum logic gate is performed on the qubit devices 212F, 212I and the associated tunable-frequency coupler device 214J. In this particular example, the first and third two-qubit native quantum logic gates are not applied to a common qubit device and thus can be grouped in the same group. Therefore, the first and third two-qubit native quantum logic gates can be calibrated together. In other words, the control parameters of the control signals for executing the first and third two-qubit native quantum logic gates are determined when the two gates are performed in parallel. Similarly, the second and third two-qubit native quantum logic gates may be also performed in parallel. In other words, the second and third two-qubit native quantum logic gates may be in the same group of operations. On the other hand, since the first and second two-qubit native quantum logic gates are applied to a common qubit defined by a common qubit device 212E, these two two-qubit native quantum logic gates cannot be performed in parallel during a time step and thus cannot be grouped together in the same group of operations. In some instances, other criteria may be used to identify groups of operations in the quantum program.

At 318, augmented groups of operations are defined. In some implementations, an augmented group of operations in the third sequence is defined by adding single-qubit identity gates to a respective group of operations in the second sequence. In some implementations, locations, types, and numbers of single-qubit identity gates added to a group of operations are determined according to locations of the first qubit devices which defines the first subset of qubits where the native quantum logic gates in the respective group of operations are applied to, connectivities of the first qubit devices, and other parameters.

Figure 4A:
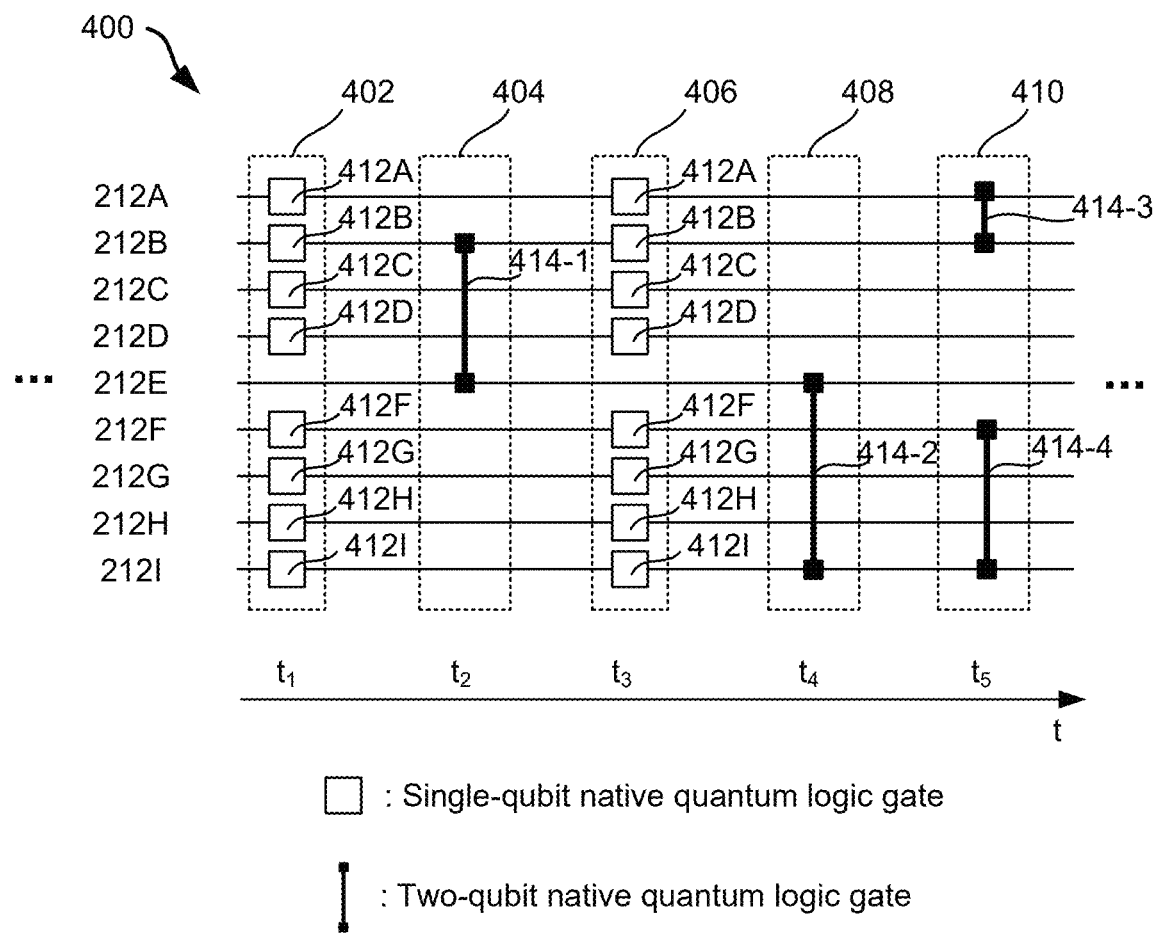
FIG. 4A is a schematic diagram showing aspects of an example quantum logic circuit.
Figure 4B:
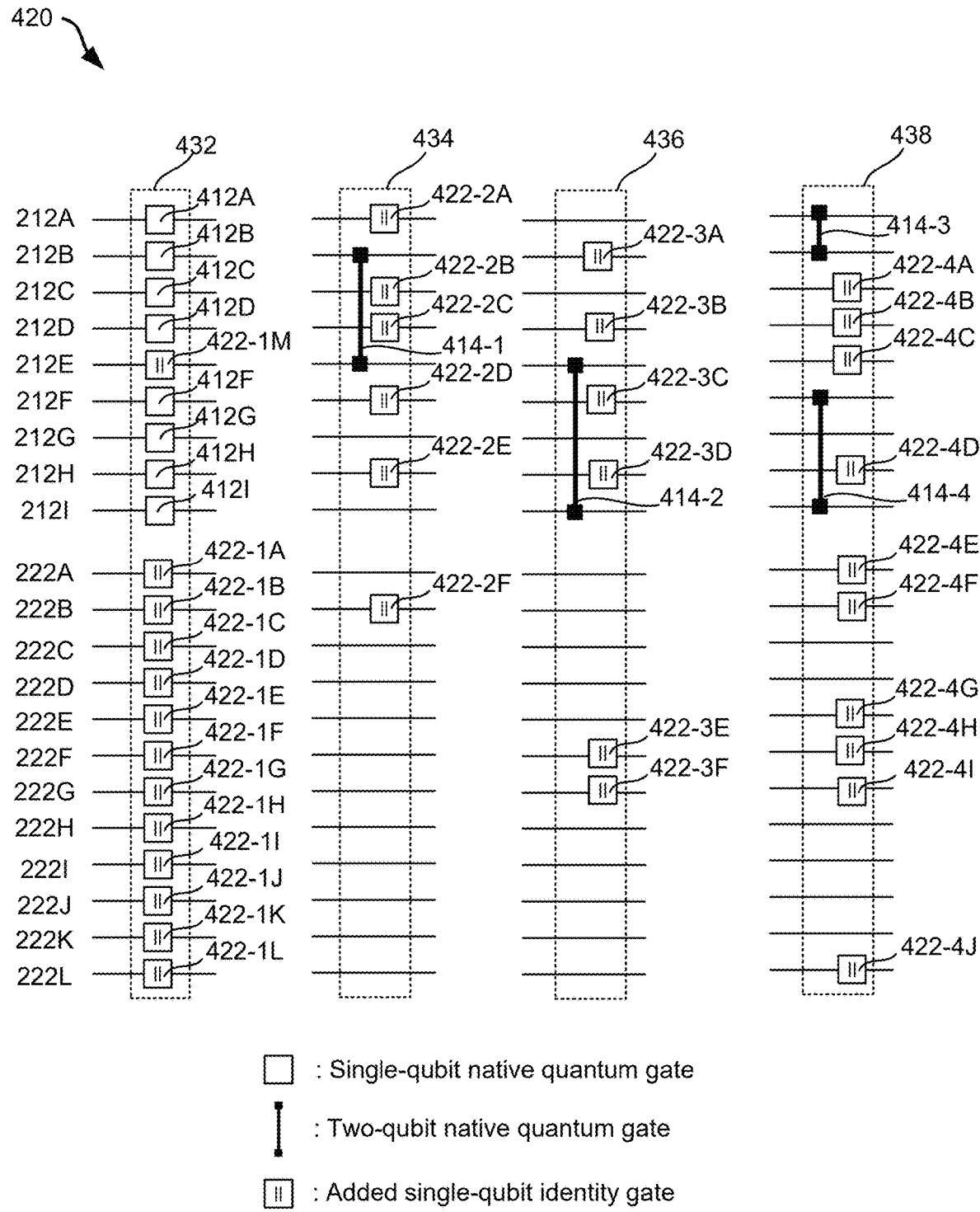
FIG. 4B is a schematic diagram showing aspects of an example quantum logic circuit.

When a group of operations includes a two-qubit native quantum logic gate (e.g., the two-qubit native quantum logic gate 414-1) executed on the qubit devices 212B, 212E and the associated tunable-frequency coupler device 214D, six single-qubit identity gates (e.g., the single-qubit identity gate 422-2) may be added to form an augmented group of operations (e.g., the group 434 in FIG. 4B). In particular, the six single-qubit identity gates (e.g., the single-qubit identity gates 422-2A, 422-2B, 422-2C, 422-2D, 422-2E, and 422-2F) are added to three qubit devices (e.g., the qubit devices 212A, 212C, 222B) that are nearest neighbors of the qubit device 212B; and three qubit devices (e.g., the qubit devices 212D, 212F, 212H) that are nearest neighbors of the qubit device 212E. In some implementations, the six added single-qubit identity gates are calibrated to be executed in parallel with the two-qubit native quantum logic gate in the same augmented group; and similarly, the two-qubit native quantum logic gate is calibrated to be executed in parallel with the six added single-qubit identity gates.

In some implementations, when a group of operations is augmented, control operations are also added to the group of operations. For example, control operations can be added to communicate control signals to respective coupler devices between each of the qubit devices 212B, 212E and its nearest neighbors to deactivate respective couplings. In particular, control operations is configured to tune transition frequencies of the respective tunable-frequency coupler devices 214A, 214B, 214F, 214G, 214I, and 224B to their parking values such that the respective pairs of qubit devices are decoupled, e.g., to disable or reduce interactions between the pairs of qubit devices. In this case, the control operations may include communicating coupler flux bias signals to the respective tunable-frequency coupler devices to tune coupler flux bias experienced by the respective tunable-frequency coupler devices and thus tune the respective transition frequencies of the respective tunable-frequency coupler devices. In this case, the two-qubit native quantum logic gate in a group of operations is calibrated to be performed in parallel with the added control operations applied on the coupler devices.

At 306, a calibration process is performed. In some implementations, a calibration process is performed to determine control parameters of control signals for executing the augmented groups of operations on the quantum processing unit. In certain instances, the augmented groups in the third sequence that are distinct from one another are identified and calibrated during the calibration process.

In some instances, device parameters of the designated quantum circuit devices where the organized quantum program is executed are obtained. In some implementations, the device parameters of the qubit devices and tunable-frequency coupler devices in the quantum processing unit are determined by performing a measurement or characterization process, a tune-up process, or another type of calibration process. In some instances, a measurement process can characterize a particular set of quantum circuit devices in the quantum processing unit for performing the organized quantum program. In some instances, the device parameters may be predetermined using another process, which then can be stored and obtained in another manner. For example, a measurement process can be executed to characterize all the quantum circuit devices in a quantum processing unit to obtain the device parameters of each of the qubit devices and coupler devices in a device array, for example, once a quantum processor is cooled down.

In some instances, device parameters that can be used to characterize a tunable-frequency qubit device include a tunable range of transition frequencies. In certain examples, a tunable range of transition frequencies is defined by a maximal frequency value, e.g., the $|0\rangle \rightarrow |1\rangle$ transition frequency value at a magnetic flux of zero flux quantum applied to the tunable-frequency qubit device, $$\omega_{01}(\phi=0) \equiv \omega_{01}^{max} \quad (1)$$

and a minimum frequency value, e.g., the $|0\rangle \rightarrow |1\rangle$ transition frequency value at a magnetic flux of half-flux quantum, $$\omega_{01}\left(\Phi = \frac{\Phi_0}{2}\right) \equiv \omega_{01}^{min} \quad (2)$$

anharmonicity at the magnetic flux of zero flux quantum, $$\eta(\phi=0) \equiv \eta^{max} \quad (3)$$

and the qubit flux bias $\phi$, e.g., $$Q = Q(\omega_{01}^{max}, \omega_{01}^{min}, \eta^{max}, \phi) \quad (4)$$

where Q represents a collection of device parameters that can be used to describe a qubit device. In some implementations, a maximal frequency value may be at a different magnetic flux. For example, a maximal frequency value may be at a value offset from a magnetic flux of zero flux quantum, a magnetic flux of half flux quantum, or another value.

In some implementations, the device parameters may include one or more of the device parameters of the tunable-frequency qubit device in the quantum processing unit. For example, device parameters, such as a maximum transition frequency $\omega_{12}^{max}$, and the anharmonicity ($\eta$) at $\omega_{12}^{max}$, can be used to characterize the qubit implementation beyond the lowest two states. In some instances, device parameters further include periodicity, coupling strengths, and other device parameters can be calibrated, measured, and stored, e.g., in a database of the memory 112 of the server 108. In certain instances, circuit parameters of circuit components in an equivalent circuit representing quantum circuit devices in the quantum processing unit can be calculated based on the device parameters.

In some examples, the transition frequency of a tunable-frequency qubit device or a tunable-frequency coupler device from the ground state $|0\rangle$ to the first excited state $|1\rangle$ is measured by using qubit spectroscopy. Ramsey interferometry can then be used to fine tune the value of the transition frequency obtained from the spectroscopic measurement. In some instances, the transition frequency can be measured at one or more reference values of the applied magnetic flux. For example, the transition frequency of a tunable-frequency qubit device can be measured at zero flux and one-half flux quantum; the tunable-frequency qubit devices may be measured under other flux conditions.

In some examples, after the transition frequencies of the tunable-frequency qubit device are obtained, qubit spectroscopy can be used to measure the transition frequency from the ground state $|0\rangle$ to the second excited state $|2\rangle$ which can be used to calculate the anharmonicity of the tunable-frequency qubit device. For instance, the absolute value of the anharmonicity of a tunable-frequency qubit device may be computed as $|\eta| = |2\omega_{01} - \omega_{02}|$, where $\omega_{01}$ represents the transition frequency from the ground state $|0\rangle$ to the first excited state $|1\rangle$ of the tunable-frequency qubit device, and $\omega_{02}$ represents the transition frequency from the ground state $|0\rangle$ to the second excited state $|2\rangle$ of the tunable-frequency qubit device.

In some implementations, a control signal includes a flux bias signal that can be communicated to the tunable-frequency qubit device on a flux bias control line to tune the transition frequency. In some implementations, a control signal includes a flux modulation signal which can be communicated to the tunable-frequency qubit device on a flux bias control line to modulate the transition frequency. In certain instances, the control signal also includes a drive signal which can be communicated to the tunable-frequency qubit device on a distinct qubit drive control line to activate a single-qubit quantum logic gate. In certain instances, control signals, such as flux modulation signal and qubit drive signal, may be communicated to a qubit device on a common control line which is inductively and capacitively coupled to the qubit device. Control signals (e.g., a flux bias signal, a flux modulation signal, a qubit drive signal or another type of control signal) can be characterized by control parameters of the control signals including modulation parameters such as a DC flux bias $\phi_{dc}$, a flux modulation amplitude Pac, a flux modulation frequency $f_m$, a modulation phase $\theta_m$, and drive parameters, such as a drive amplitude $\Omega_d$, a drive frequency $f_d$, and a drive phase $\theta_d$. In certain examples, the device parameters obtained from the device measurement process can be used to determine initial values of the control parameters of the control signals that can be applied to the respective quantum circuit devices, e.g., to activate a coupling between two qubit devices by tuning the coupler flux bias from a parking value to a gate-activating value, to deactivate a coupling between two qubit devices by tuning the coupler flux bias from a gate-activating value to a parking value, to bring two qubit devices into resonance for a precise time period, and to perform other functions.

In the example shown in FIG. 3, performing the calibration process at 306 includes sub-operations 320 and 322. At 320, the distinct augmented groups of operations (e.g., the groups of operations 432, 434, 436, 438) in the organized quantum program are identified. For example, two augmented groups of operations may be considered distinct when they include different numbers of quantum logic gates; different types of quantum logic gates; or may include the same quantum logic gates but performed on different quantum circuit devices. In some cases, two augmented groups of operations may be considered distinct when they include a different native quantum logic gate, a single-qubit identity gate applied on a qubit defined by a different qubit device, or a different control operation.

At 322, control parameters of control signals to execute the distinct, augmented groups of operations in the organized quantum program are determined. In some implementations, a calibration process is performed on quantum circuit devices of a quantum processing unit for each of the distinct, augmented groups of operations. In some implementations, a calibration process is performed to determine optimal values of the control parameters of the control signals for executing the operations (e.g., native quantum logic gates, single-qubit identity gates, and control operations) in the same augmented group in parallel. In some instances, a calibration process is or includes an objective optimization process with an optimization objective to maximize performance. For example, an optimization objective in a calibration process may include maximizing gate fidelity, or other optimization objectives. In some implementations, a calibration process may be a gate optimization process with multiple objectives.

To perform the calibration at 322, the control system of the quantum computing system generates calibration signals, and the calibration signals are delivered to the quantum processing unit of the quantum computing system. The calibration signals can include, for example, microwave pulses applied to individual circuit devices (e.g., qubit devices), flux bias signals applied to individual coupler devices (e.g., tunable-frequency coupler devices), or other types of signals. The control system then obtains calibration measurements from the quantum processing unit, and the control system uses the calibration measurements to determine the control parameters. For instance, in the quantum computing system 103A shown in FIG. 1, the controllers 106A can identify calibration signals that are configured to execute a pre-defined calibration routine, and the calibration signals can then be generated by the signal hardware 104A and delivered to devices (e.g., qubit devices) in the quantum processing unit 102A. The pre-defined calibration routine can include, for example, the types of experiments, measurements, processes, optimization criteria or other features described in U.S. Pat. No. 10,282,675 entitled "Performing a Calibration Process in a Quantum Computing System;" other types of calibration routines may be used in some cases. During the calibration process, the control system 105A obtains calibration measurements from the quantum processing unit 102A and uses the calibration measurements in the calibration routine, for instance, to identify an improved or optimal value of one or more control parameters. The calibration measurements may include readout signals from resonator devices or other types of measurements obtained from the quantum processing unit 104A. The control parameters that are modified based on the calibration measurements can include, for example, the amplitude (power), frequency, duration, or phase of a microwave pulse; the amplitude (power), frequency, duration, or phase of a flux bias signal; or other types of control parameters for control signals.

In some implementations, during operation 322, calibration signals are generated (e.g., by operation of the control system 202 in FIG. 2) according to values of the control parameters (e.g., the initial values of the control parameters determined based on the device parameters or the improved values determined during the calibration process) and delivered to respective quantum circuit devices of the quantum processing unit (e.g., the qubit devices where native quantum logic gates are executed, the qubit deices where single-qubit identity gates are executed, and the coupler devices). In order to perform a calibration measurement, calibration signals are communicated to respective quantum circuit devices to perform operations on the respective quantum circuit devices, e.g., tuning the effective coupling strength between two qubit devices, tuning the transition frequency of a tunable-frequency qubit devices, and other operations. In some implementations, results of the calibration measurements are obtained from the quantum processing unit. For example, improved values of the control parameters of the calibration signals communicated to the respective quantum circuit devices, when the operations within the same augmented group are executed in parallel, can be determined.

In some cases, the calibration process may include a continuous-wave (CW) characterization procedure, which may include cavity spectroscopy measurements, qubit spectroscopy measurements, T1 and T2 measurements, and others. In some cases, the calibration process can include a pulsed characterization procedure, which may include cavity spectroscopy measurements, Rabi spectroscopy measurements, Ramsey spectroscopy measurements, power Rabi measurements, T1 and T2 measurements, and others. The CW or pulsed characterization procedures may perform measurements to detect the quality factor, resonance frequency, Lamb shift and other parameters of a device.

In some cases, the calibration process performed at 322 includes a gate tune-up procedure. For example, the gate tune-up procedure may include optimization of readout pulses or parameters, AC Stark coefficient measurements, pi-pulse amplitude tune-ups, Derivative Removal by Adiabatic Gate (DRAG) tune-ups, randomized benchmarking, other types of benchmarking, and others. The gate tune-up may include measurement of coupling strengths between qubit devices, characterization of tuning pulses for tunable-frequency qubit devices, and other types of measurements. In some cases, the calibration process performed at 322 includes a tune-up of multi-qubit quantum logic gates, single-qubit quantum logic gates, benchmarking procedures, or other types of processes.

In some cases, the calibration process performed at 322 may include a tune-up procedure for parametrically-activated two-qubit quantum logic gates. The parametrically-activated two-qubit quantum logic gate can be a quantum logic gate applied to a pair of qubits, where at least one of the qubits is defined on a tunable-frequency qubit device. The parametrically-activated two-qubit gate can be performed by modulating the resonance frequency of the tunable-frequency qubit device. The tune-up procedure can include, for example, characterizing both qubits, calibrating the flux drive line transfer function, determining a good candidate resonance for coupling, determining an amplitude for flux modulation, performing a multidimensional modulated flux pulse measurement, optimizing over pulse parameters, and other types of operations.

In some cases, sub-steps 320, 322 (and possibly other operations) within operation 306 are executed as an iterative process, where each iteration includes determining, based on a first set of quantum circuit devices with a first set of device parameters, initial values of control parameters of control signals for executing a first augmented group of operations; and determining optimal values of the control parameters of the control signals for executing the first augmented group of operations. The next iteration is then performed to determine improved values of control parameters of control signals for executing a second, distinct augmented group of operations on a second set of quantum circuit devices with a second set of device parameters. When all the improved values of control parameters of control signals for executing all the distinct augmented groups of operations in the third sequence, the iterative process can terminate. The improved values of the control parameters of the control signals corresponding to an augmented group of operations are then stored in a database (e.g., in the memory 112 of the server 108 in FIG. 1). Each iteration of the iterative process may include additional operations and parameter evaluations.

At 308, the organized quantum program is executed using the control parameters. In some implementations, the organized quantum program is obtained from operation 304 and the control parameters of the control signals are obtained from operation 306. In some instances, the improved values of the control parameters are used when the organized quantum program is executed at 308. In some implementations, when two augmented groups of operations at two different time steps in the third sequence are identical, the same control parameters of the control signals can be used.

The procedure described in this patent application can be used in error correction and/or error mitigation protocols as well. For example, logical quantum memories can be implemented with a series of repeated and predefined quantum operations. The "program to execute" (element 312 in FIG. 3) can be the base algorithm of the quantum error correction code (for example, but not limited to, the sequence of stabilizer measurements). In other instances, when logical operations must be applied, the "program to execute" (element 312 in FIG. 3) consists of the base algorithm of the quantum error correction code and the operations to the physical qubits to implement a logical operation.

FIG. 4A is a schematic diagram showing aspects of an example quantum logic circuit 400. In some implementations, the example quantum logic circuit 400 represents part of the second sequence of quantum logic gates in the organized quantum program obtained with respect to the operation 316 of the example process 300. In some instances, the example quantum logic circuit 400 may be generated by operation of a compiler in a server (e.g., the server 108 of the computing system 101 of FIG. 1) based on a quantum program (e.g., a user program) received from a user device (e.g., the user device 110 of FIG. 1). As shown in FIG. 4A, the qubit devices 212 and the associated tunable-frequency coupler devices 214 in the example quantum processing unit 204 of FIG. 2 are specified by the server on which the example quantum logic circuit 400 is performed.

As shown in FIG. 4A, the example quantum logic circuit 400 includes a first group of operations 402 at a first time step $t_1$, a second group of operations 404 at a second time step $t_2$, a third group of operations 406 at a third time step $t_3$, a fourth group of operations 408 at a fourth time step $t_4$, and a fifth group of operations 410 at a fifth time step $t_5$. The first group of operations 402 includes eight single-qubit native quantum logic gates 412; the second group of operations 404 includes a first two-qubit native quantum logic gate 414-1; the third group of operations 406 includes eight single-qubit native quantum logic gates 412; the fourth group of operations 408 includes a second two-qubit native quantum logic gate 414-2; and the fifth group of operations 410 includes a third and a fourth two-qubit native quantum logic gates 414-3, 414-4. The example quantum logic circuit 400 may include additional or different native quantum logic gates applied on additional qubits defined by additional qubit devices; include native quantum logic gates performed by additional or different qubit devices; include additional or different groups of operations at additional time steps; and the native quantum logic gates may be performed in the order shown or in another order.

As shown in FIG. 4A, the eight single-qubit native quantum logic gates 412A, 412B, 412C, 412D, 412F, 412G, 412H, 412I in each of the first and third groups of operations 402, 406 are applied on qubits defined by the qubit devices 212A, 212B, 212C, 212D, 212F, 212G, 212H, 212I of the quantum processing unit 204; the first two-qubit native quantum logic gate 414-1 in the second group of operations 404 are applied on qubits defined by the qubit devices 212B, 212E of the quantum processing unit 204, which are directly coupled through the associated tunable-frequency coupler device 214D; the second two-qubit native quantum logic gate 414-2 in the fourth group of operations 408 are applied on qubits defined by the qubit devices 212E, 212I of the quantum processing unit 204, which are indirectly coupled; the third two-qubit native quantum logic gate 414-3 in the fifth group of operations 410 are applied on qubits defined by the qubit devices 212A, 212B of the quantum processing unit 204, which are directly coupled through the associated tunable-frequency coupler device 214A; and the fourth two-qubit native quantum logic gate 414-4 in the fifth group of operations 410 are applied on qubits defined by the qubit devices 212F, 212I of the quantum processing unit 204, which are directly coupled through the associated tunable-frequency coupler device 214J.

As shown in FIG. 4A, each of the first and the third groups of operations 402, 406 includes only single-qubit native quantum logic gates 412; each of the second, third, and fourth groups of operations 404, 408, 410 includes only two-qubit native quantum logic gates 414. In some instances, when a group of operations includes multiple two-qubit native quantum logic gates, the multiple two-qubit native quantum logic gates are not applied on a qubit that is defined by a common qubit device. In other words, any two two-qubit native quantum logic gates that are performed on a common qubit device are separated into two different groups of operations. For example, the first and second two-qubit native quantum logic gates 414-1 and 414-2 are applied on a qubit defined by a common qubit device 212E. Therefore, the first and second two-qubit native quantum logic gates 414-1 and 414-2 are included in two distinct groups of operations 404, 408. When a group of operations includes multiple operations (e.g., multiple quantum logic gates), the multiple operations are performed in parallel at a corresponding time step.

FIG. 4B is a schematic diagram showing aspects of an example quantum logic circuit 420. In some implementations, the example quantum logic circuit 420 are obtained with respect to the operations 318 and 320 of the example process 300. In this case, the example quantum logic circuit 420 represents part of the third sequence of quantum logic gates in the organized quantum program determined in the example process 300. In some instances, the example quantum logic circuit 420 may be generated by operation of a compiler in a server (e.g., the server 108 of the computing system 101 of FIG. 1) based on the example quantum logic circuit 400 shown in FIG. 4A. As shown in FIG. 4B, the example quantum logic circuit 420 includes a first group of operations 432, a second group of operations 434, a third group of operations 436, and a fourth group of operations 438. In some implementations, the four distinct groups of operations 432, 434, 436, 438 shown in FIG. 4B are formed by identifying distinct groups of operations 402, 404, 408, 410 from the example quantum logic circuit 400 and by adding single-qubit identity gates to the respective distinct groups of operations 402, 404, 408, 410. In some instances, each of the four group of operations 432, 434, 436, 438 shown in FIG. 4B may include control operations, e.g., control operations to activate or deactivate associated tunable-frequency coupler devices or other control operations.

As shown in FIG. 4B, the four groups 432, 434, 436, 438 in which the single-qubit identity gates are added are distinct. When a calibration process is performed or when the organized quantum program is executed, the native quantum logic gates and the added single-qubit identity gates in the same group of operations are executed in parallel. In this case, control parameters of control signals for executing the group of operations on respective quantum circuit devices in the quantum processing unit. In some implementations, a calibration process is performed on each of the distinct groups in the example quantum logic circuit 420 at a time. The calibration process is performed on each of the distinct groups to obtain optimal values of the control parameters of the control signals for executing the group of operations. Groups of operations that includes identical quantum logic gates applied on identical quantum circuit devices, e.g., the first and third groups 402, 406, after adding the single-qubit identity gates with respect to operation 318 of the example process 300, are also identical. In this case, identical groups of operations may be calibrated once during a calibration process (e.g., the calibration process 306 in FIG. 3) to obtain optimal values of the control parameters, which can be stored and later applied to when the identical groups of operations are executed at different time steps in the organized quantum program.

FIGS. 5A-5D are schematic diagrams showing aspects of example quantum processing units 500, 510, 520, 530 when the groups of operations 432, 434, 436, 438 in the example quantum logic circuit 420 of FIG. 4B are executed, respectively. In some implementations, qubit devices 212 and associated tunable-frequency coupler devices 214 are selected for performing a quantum program represented by the example quantum logic circuit 420. Qubit devices 222 and the associated tunable-frequency coupler devices 224 in the example quantum processing unit 204 that are not selected for performing the quantum program may be used in other quantum logic gates of another quantum program or may not be used at all.

In some instances, quantum circuit devices where the added single-qubit identity gates are executed are determined according to flux crosstalk experienced, responses to the experienced flux crosstalk, or another criteria. For example, when a flux bias is applied on a qubit defined by a first qubit device for executing a quantum logic gate, the flux bias may be experienced by a second qubit device. This flux crosstalk may alter the quantum state of the second qubit device. In order to assure the flux bias does not affect the quantum state of the second qubit device, a single-qubit identity gate can be applied to the second qubit device when the quantum logic gate is executed on the first qubit device in parallel. For another example, a flux bias applied on a qubit defined by the first qubit device may be also experienced by a tunable-frequency coupler device coupling the first and second qubit devices, the transition frequency of which may be shifted by the flux crosstalk affecting the coupling rate between the first and second qubit devices. In some instances, the second qubit device is a nearest-neighbor qubit device of the first qubit device. In certain instances, the second qubit device may include qubit devices that are not nearest-neighbors to the first qubit device. For example, the second qubit device may be operably coupled to the first qubit device through multiple coupler devices, a quantum bus, or another coupling mechanism.

As shown in FIGS. 5A-5D, islands, including first qubit devices in the quantum processing unit defining qubits on which native quantum logic gates in a group of operation are applied, are identified. Once an island of qubit devices is identified, boundaries of the island can be identified. Single-qubit identity gates can be added to second qubit devices that are located outside the boundaries of the island and operably coupled to the first qubit devices within the island; and control operations to deactivate the coupling between the first and second qubit devices are also applied to coupler devices that are located on the boundaries of the island. In some implementations, control operations to deactivate coupler devices within the island to effectively isolate qubit devices for performing single-qubit native quantum logic gates are also included in the augmented groups of operations. In some implementations, quantum circuit devices, either qubit devices or coupler devices, are determined as non-critical, for example, when the quantum circuit devices are not nearest neighbors to the first qubit devices, not operably coupled to the first qubit devices, the response to a flux crosstalk is below a threshold value, are used when a different quantum program is executed, are defective, or for another reason.

As shown in FIG. 4B, the first augmented group of operations 432 includes eight single-qubit native quantum logic gates 412 and thirteen single-qubit identity gates 422-1; the second group of operations 434 includes a two-qubit native quantum logic gate 414-1 and six single-qubit identity gates 422-2; the third augmented group of operations 436 includes a second two-qubit native quantum logic gate 414-2 and six unitary operators 422-3; and the fourth augmented group of operations 438 includes a third and a fourth two-qubit native quantum logic gates 414-3, 414-4 and ten single-qubit identity gates 422-4. The example quantum logic circuit 420 may include additional groups of operations; each of the groups of operations may include additional or different native quantum logic gates; the groups of operations include native quantum logic gates applied on qubits defined by additional or different qubit devices; and the native quantum logic gates may be performed in the order shown or in another order.

As shown in FIG. 4B, the first augmented group of operations 432 of the example quantum logic circuit 420 is formed by adding single-qubit identity gates to one of the first or the third groups 402, 406 of the example quantum logic circuit 400. Specifically, single-qubit identity gates that are added are applied on qubits defined by qubit devices that are nearest neighbors of boundary qubit devices in an island 502 where the single-qubit native quantum logic gates 412 are executed. In particular, a single-qubit identity gate 422-1M is added to a qubit defined by the qubit device 212E; and twelve single-qubit identity gates 422-1A, 422-1B, 422-1C, 422-1D, 422-1E, 422-1F, 422-1G, 422-1H, 422-1I, 422-1J, 422-1K, 422-1L are applied to qubits defined by the qubit devices 222A, 222B, 222C, 222D, 222E, 222F, 222G, 222H, 222I, 222J, 222K, 222L.

In some implementations, the first augmented group of operations 432 includes other added operations. For example, control operations to deactivate two neighboring qubit devices when single-qubit native quantum logic gates are executed on the two neighboring qubit devices are included in the first augmented group of operations 432. In other words, control parameters of control signals are determined when all the operations in the first augmented group of operations 432 are executed in parallel. In particular, associated tunable-frequency coupler devices 214A, 214B, 214C, 214E, 214H, 214J, 214K, 214L within the boundary of the island 502 in FIG. 5A between two neighboring qubit devices, on which two single-qubit native quantum logic gates are executed, are deactivated. For another example, associated tunable-frequency coupler devices 214D, 214F, 214G, 214I located on inner boundaries of the island 512, and associated tunable-frequency coupler devices 224A, 224B, 224C, 224D, 224E, 224F, 224G, 224H, 224I, 224J, 224K, 224L on outer boundaries of the island 512 in FIG. 5B between each of the qubit devices on which the single-qubit native quantum logic gate is executed and each of the coupled qubit devices on which the single-qubit identity gates are executed, are deactivated. When the quantum processing unit 204 is part of a layer in a three-dimensional lattice and qubit devices on different layers may be coupled to each other through respective tunable-frequency coupler devices across the different layers. In this case, the respective tunable-frequency coupler devices across different layers may be also deactivated. In some instances, tunable-frequency coupler devices can be deactivated by tuning control parameters (e.g., the coupler flux bias to respective parking values) of the control signals communicated to the tunable-frequency coupler devices. In this case, during the calibration process, the control parameters of the control signals for deactivating the respective tunable-frequency coupler devices can be determined, when all the operations within the first augmented group of operations 432 are performed in parallel.

As shown in FIG. 4B, the second augmented group of operations 434 of the example quantum logic circuit 420 is formed by adding single-qubit identity gates to the second group 404 of the example quantum logic circuit 400. Specifically, single-qubit identity gates are added to qubit devices that are nearest neighbors to boundary qubit devices in an island 512 of FIG. 5B on which the two-qubit native quantum logic gate 414-1 are executed. In particular, the six single-qubit identity gates 422-2A, 422-2B, 422-2C, 422-2D, 422-2E, 422-2F are applied to qubits defined by the qubit devices 212A, 212C, 212D, 212F, 212H, 222B, respectively, to ensure quantum states of these neighboring qubit devices are not affected (e.g., through flux crosstalk) during the execution of the two-qubit native quantum logic gate 414-1. In other words, control parameters of the control signals applied on the qubit devices 212B, 212E and the associated tunable-frequency coupler device 214D are determined, when the six single-qubit identity gates 422-2A, 422-2B, 422-2C, 422-2D, 422-2E, 422-2F are executed in parallel.

Figure 5B:
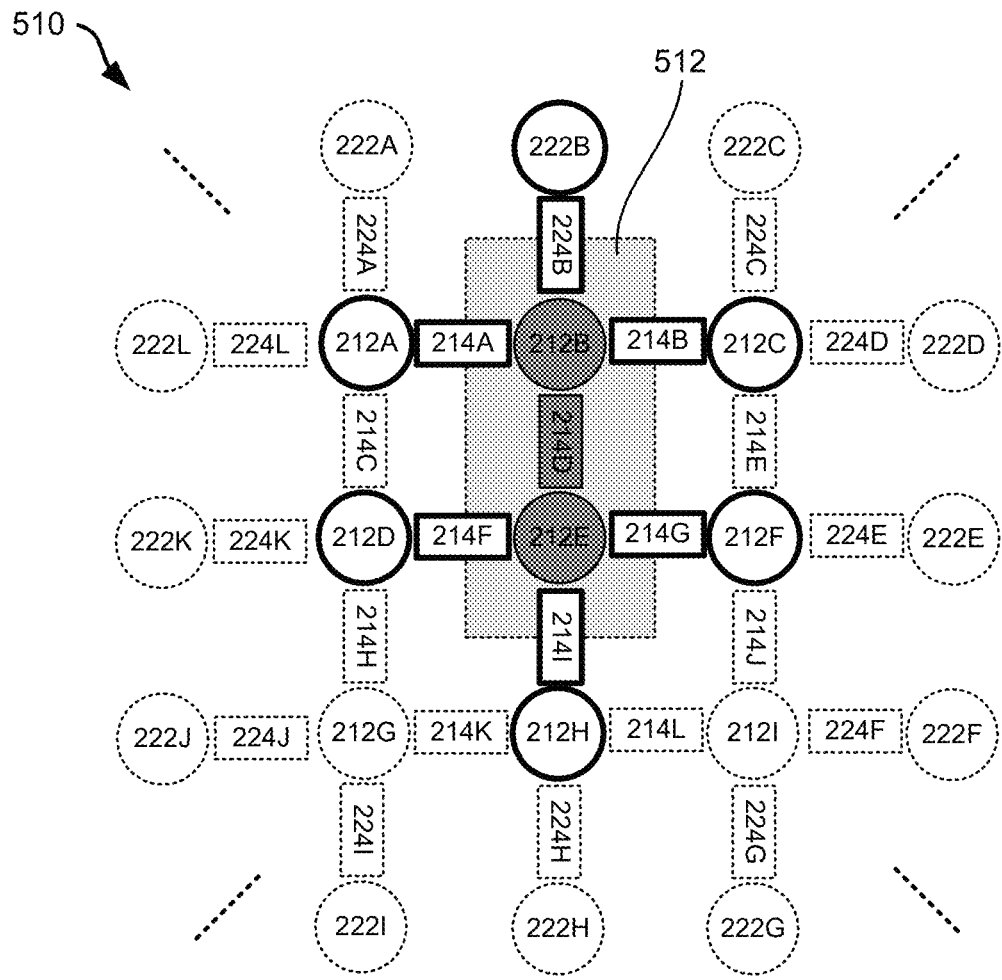

In some implementations, associated tunable-frequency coupler devices 214A, 214B, 214F, 214G, 214I and 224B located on the boundaries of the island 512 in FIG. 5B are deactivated. In this case, control parameters of control signals to tune coupler flux biases on these associated tunable-frequency coupler devices can be determined during the calibration process, when the added single-qubit identity gates 422-2 and the two-qubit native quantum logic gate 414-1 are executed in parallel. In some instances, optimal values of the control parameters can be determined by optimizing an objective function (e.g., minimizing the coupling rates).

Figure 7:
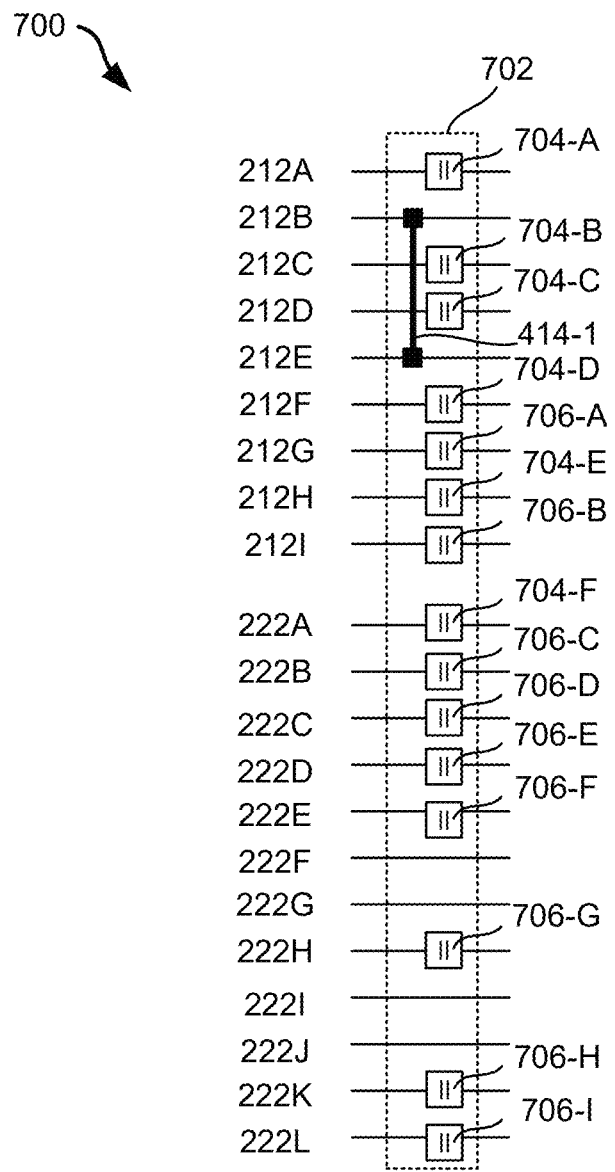
FIG. 7 is a schematic diagram showing aspects of an example quantum logic circuit.
Figure 8:
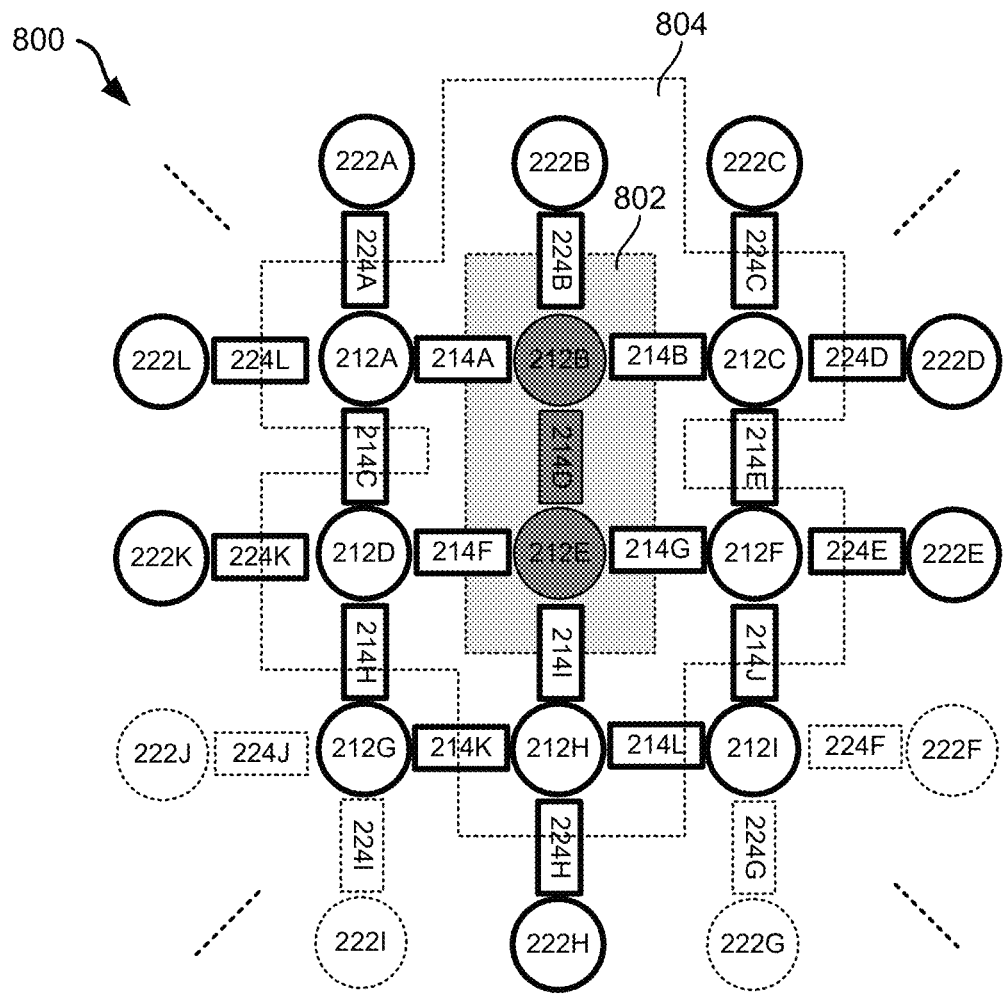
FIG. 8 is a schematic diagram showing aspects of the quantum processing unit in FIG. 2 when the example quantum logic circuit in FIG. 7 is executed in parallel.

In some instances, single-qubit identity gates may be added to quantum circuit devices that are not immediate neighbors to the qubit devices on which the native quantum logic gates are executed. In some instances, single-qubit identity gates may be added to other quantum circuit devices. FIGS. 7 and 8 show an example quantum program, in which an augmented group of operations may include additional single-qubit identity gates or control operations that can provide a "double-layer isolation".

As shown in FIG. 4B, the third augmented group of operations 436 of the example quantum logic circuit 420 is formed by adding single-qubit identity gates to the second group of operations 404 of the example quantum logic circuit 400. Specifically, single-qubit identity gates are applied on qubits defined by qubit devices that are nearest neighbors to boundary qubit devices of an island 522 of FIG. 5C on which the two-qubit native quantum logic gate 414-2 are executed. In particular, the six single-qubit identity gates 422-3A, 422-3B, 422-3C, 422-3D, 422-3E, 422-3F are applied to qubits defined by the qubit devices 212B, 212D, 212F, 212H, 222F, 222G, respectively, to ensure quantum states of these neighboring qubit devices are unchanged during the application of the two-qubit native quantum logic gate 414-2. In other words, control parameters of the control signals communicated to the qubit devices 212E, 212I and the associated tunable-frequency coupler device 214I, 214L, 214G, 214J for executing the two-qubit native quantum logic gate are determined, when the six single-qubit identity gates 422-3A, 422-3B, 422-3C, 422-3D, 422-3E, 422-3F are executed in parallel. In this case, the qubit devices 212E, 212I are not directly coupled through a single dedicated coupler device. Instead, the qubit devices 212E, 212I are coupled through neighboring coupler devices 214I, 214L, 214G, 214J, and neighboring qubit devices 212H and 212F. In some instances, the qubit devices 212E, 212I may be indirectly coupled to each other through another coupling mechanism. In this case, optimal values of control parameters are those that can maximize the effective coupling between the two qubit devices that are not nearest neighbors. Similarly, optimal values of control parameters of control signals to decouple two qubit devices that are not nearest neighbors (e.g., indirectly coupled through multiple other quantum circuit devices) are those that can minimize the effective coupling.

Figure 5C:
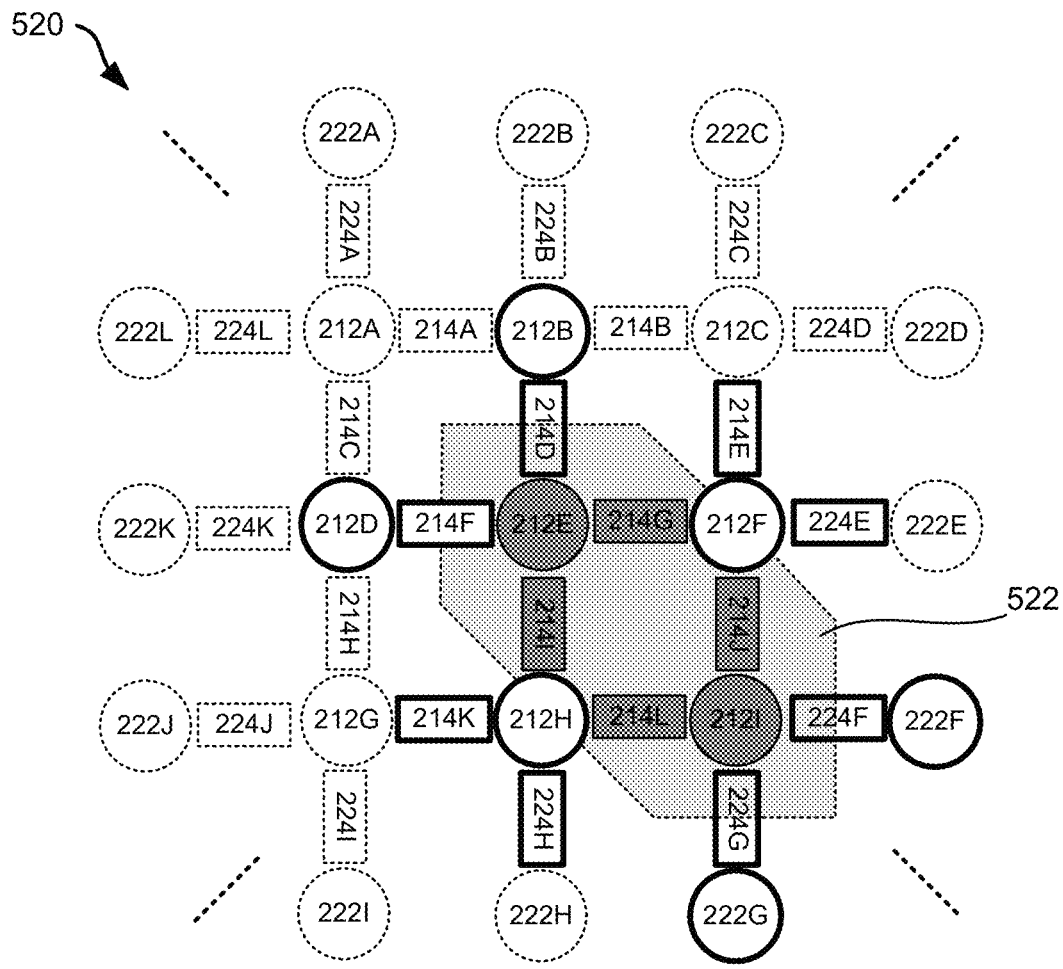

In some implementations, associated tunable-frequency coupler devices 214D, 214F, 224F and 224G located on boundaries of the island 522 in FIG. 5C are deactivated. As shown in FIG. 5C, the tunable-frequency coupler devices 214E, 224E, 214K, 222H can also be deactivated. Single-qubit identity gates are applied to the qubits defined by the intermediate qubit devices 212F, 212H. In this case, the control parameters of the control signals to tune coupler flux biases on these associated tunable-frequency coupler devices can be determined, when the added single-qubit identity gates 422-3 and the two-qubit native quantum logic gate 414-2 are executed in parallel. In some instances, optimal values of the control parameters may be determined by optimizing an objective function (e.g., minimizing the coupling rates).

As shown in FIG. 4B, the fourth augmented group of operations 438 of the example quantum logic circuit 420 is formed by adding single-qubit identity gates to the fifth group of operations 410 of the example quantum logic circuit 400 in FIG. 4A. Specifically, single-qubit identity gates are added to qubit devices that are nearest neighbors of boundary qubit devices of islands 532A, 532B in FIG. 5D on which the two-qubit native quantum logic gates 414-3, 414-4 are executed. In particular, ten single-qubit identity gates 422-4A, 422-4B, 422-4C, 422-4D, 422-4E, 422-4F, 422-4G, 422-4H, 422-4I, 422-4J are applied to qubits defined by the qubit devices 212C, 212D, 212E, 212H, 222A, 222B, 222E, 222F, 222G, 222L, respectively, to ensure quantum states of these neighboring qubit devices are unchanged during the application of the two-qubit native quantum logic gates 414-3, 414-4. In other words, control parameters of the control signals applied on the qubit devices 212A, 212B and the associated tunable-frequency coupler device 214A, the qubit devices 212F, 212I and the associated tunable-frequency coupler device 214J are determined, when the ten single-qubit identity gates 422-4 are executed in parallel.

Figure 5D:
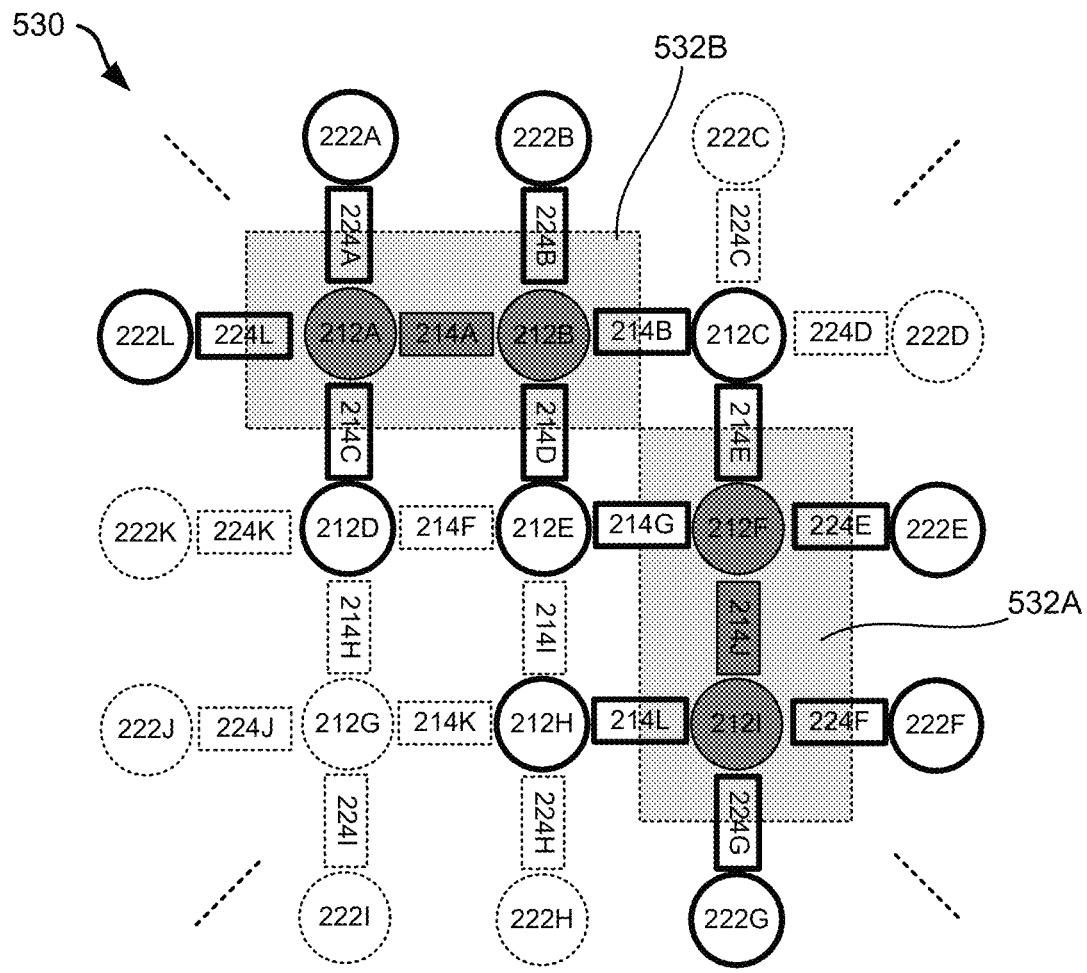

In some implementations, associated tunable-frequency coupler devices 214E, 214G, 214L, 224E, 224F, 224G located on the boundaries of the island 532A, and associated tunable-frequency coupler devices 214B, 214C, 214D, 224A, 224B, 224L located on boundaries of the island 532B in FIG. 5D are deactivated. In this case, control parameters of the control signals to tune coupler flux biases on these associated tunable-frequency coupler devices to deactivate can be determined when the added single-qubit identity gates 422-4 and the two-qubit native quantum logic gates 414-3, 414-4 are executed in parallel, by optimizing an objective function (e.g., minimizing the coupling rates).

In some instances, single-qubit identity gates applied on qubits defined by qubit devices (e.g., the qubit devices 222 in FIG. 2) that are not selected for executing the quantum program can be optionally added to augmented groups of operations. For example, qubit devices that are not selected for executing a first quantum program, may be selected for executing a second quantum program. In this case, tunable-frequency coupler devices operably coupling two neighboring islands can be deactivated for isolating qubit devices in the two neighboring islands. Control parameters of the control signals to apply the single-qubit native quantum logic gates are determined, when the single-qubit native quantum logic gates are executed in parallel with control operations to deactivate the tunable-frequency coupler devices.

Figure 6:
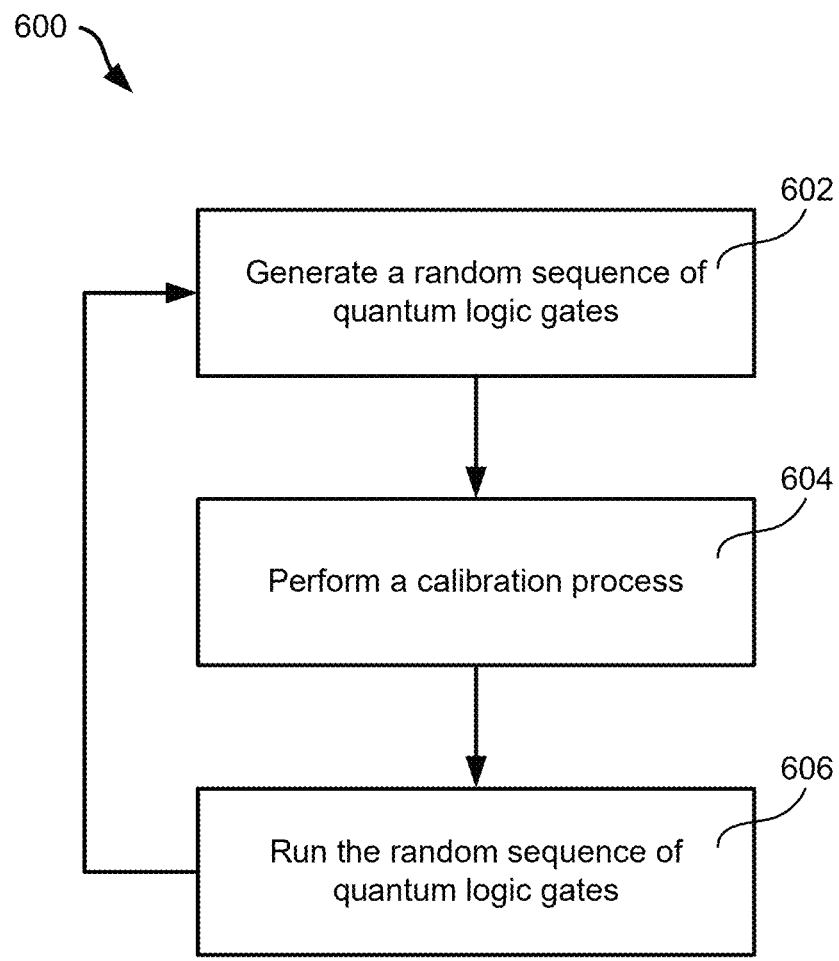
FIG. 6 is a flow chart showing aspects of an example process.

FIG. 6 is a flow chart showing aspects of an example process 600. The example process 600 can be a quantum program containing a quantum volume algorithm in which the example process 300 in FIG. 3 can be integrated. In some implementations, a quantum volume algorithm is a quantum program in which a random generation of quantum logic circuits is performed. The example process 600 may include additional or different operations, including operations performed by additional or different components, and the operations may be performed in the order shown or in another order.

In some implementations, one or more operations in the example process 600 can be performed by a computer system, for instance, by a digital computer system having one or more digital processors (e.g., a microprocessor or other data processing apparatus) that execute instructions (e.g., instructions stored in a digital memory or other computer-readable medium), or by another type of digital, quantum or hybrid computer system. As an example, in some cases the quantum processing unit can be deployed as the quantum processing unit 102 shown in FIG. 1, and operations in the example process 600 shown in FIG. 6 can be controlled, executed, or initiated by one or more components of the control system 105 shown in FIG. 1.

At 602, a random sequence of quantum logic gates is generated. In some implementations, the random sequence of quantum logic gates is generated for a particular quantum processing unit in a quantum computing system. In some instances, operation 602 is the first step in a quantum volume algorithm. At 604, a calibration process (e.g., an algorithm-dependent highly optimized calibration (AdHoc) procedure) is performed based on the generated random sequence of quantum logic gates. In some implementations, the calibration process is performed by executing some or all of the operations of the example process 300 shown in FIG. 3, or the calibration process may be performed in another manner. During the calibration process, control parameters of control signals are determined and stored in a database. At 606, the random sequence of quantum logic gates is executed using the control parameters.

In some cases, the operations 602, 604, 606 (and possibly other operations) within the process 600 are executed as an iterative process. Each iteration includes generating a random sequence of quantum logic gate, determining control parameters of control signals for performing the random sequence of quantum logic gate, and executing the random sequence of quantum logic gate using the control parameters. When all the control parameters of the control signals for performing all the random sequences of quantum logic gates are determined, the iterative process can terminate. Each iteration of the iterative process may include additional operations and parameter evaluations. Each iteration of the iterative process may include additional operations and parameter evaluations.

FIG. 7 is a schematic diagram showing aspects of an example quantum logic circuit 700. In some implementations, the example quantum logic circuit 700 is obtained with respect to the operations 318 and 320 of the example process 300. In this case, the example quantum logic circuit 700 represents part of the organized quantum program determined in the example process 300. In some instances, the example quantum logic circuit 700 may be generated by operation of a compiler in a server (e.g., the server 108 of the computing system 101 of FIG. 1) based on part of the example quantum logic circuit 400 shown in FIG. 4A. As shown in FIG. 7, the example quantum logic circuit 700 includes a group of operation 702. In some implementations, the group of operations 702 in FIG. 7 is an augmented group of operations formed by adding single-qubit identity gates to the group 404 of the example quantum logic circuit 400 in FIG. 4A. In particular, the group 702 includes a two-qubit native quantum logic gate applied on qubits defined by first quantum circuit devices (e.g., the qubit devices 212B, 212E coupled by the tunable-frequency coupler device 214D). Similar to the augmented group of operations 434 in FIG. 4B, the added single-qubit identity gates in the group of operations 702 are executed on second quantum circuit devices that are immediate neighbors (e.g., the qubit devices 212A, 212C, 212D, 212F, 212H, 222B, and the associated tunable-frequency coupler devices 214A, 214B, 214F, 214G, 214I, 224B) to the first quantum circuit devices. Quantum circuit devices that are not directly coupled to the first quantum circuit devices may experience flux talks when the two-qubit native quantum logic gate 414-1 is executed. Therefore, to effectively isolate these quantum circuit devices to make sure their quantum states are not affected during the execution of the two-qubit native quantum logic gates, the group of operations 702 also includes single-qubit identity gates that are executed on third quantum circuit devices (e.g., the qubit devices 212G, 212I, 222A, 222C, 222D, 222E, 222H, 222K, 222L, and the associated tunable-frequency coupler devices 214C, 214E, 214H, 214J, 214K, 214L, 224A, 224C, 224D, 224E, 224H, 224K, 224L). As shown in FIG. 7, the third quantum circuit devices are not directly coupled to the first quantum circuit devices, e.g., separated by the second quantum circuit devices. In some cases, when the qubit devices 222B is coupled to the neighboring qubit devices 222A, 222C on the same layer or other qubit devices resides on neighboring layers through respective tunable-frequency coupler devices, the respective tunable-frequency coupler devices may also be decoupled in order to effectively isolate the quantum circuit devices (e.g., the qubit devices 212B, 212E coupled by the tunable-frequency coupler device 214D).

FIG. 8 is a schematic diagram 800 showing aspects of the example quantum processing unit 204 in FIG. 2 when the group of operations 702 of the example quantum logic circuit 700 in FIG. 7 is executed. In some implementations, qubit devices 212B, 212E and associated tunable-frequency coupler devices 214D are selected on which the two-qubit native quantum logic gate 414-1 in the example quantum logic circuit 400 of FIG. 4A is executed.

As shown in FIG. 8, the example quantum processing unit 204 includes a first island 802 defining the first quantum circuit devices on which the two-qubit native quantum logic gate 414-1 are executed, and a second island 804 defining the second quantum circuit devices on which the added single-qubit identity gates are executed. In particular, six single-qubit identity gates 704-A, 704-B, 704-C, 704-D, 704-E, 704-F are applied to qubits defined by the qubit devices 212A, 212C, 212D, 212F, 212H, 222B, respectively; and nine single-qubit identity gates 706-A, 706-B, 706-C, 706-D, 706-E, 706-F, 706-G, 706-H, 706-I are applied to qubits defined by the qubit devices 212G, 212I, 222A, 222C, 222D, 222E, 222H, 222K, 222L, respectively. These single-qubit identity gates in the group 702 are included to ensure quantum states of the qubit devices are unchanged during the execution of the two-qubit native quantum logic gate 414-1. In other words, control parameters of the control signals applied on the qubit devices 212B, 212E and the associated tunable-frequency coupler device 214D for performing the two-qubit native quantum logic gate 414-1 are determined, when fifteen single-qubit identity gates 704, 706 are executed in parallel.

In some implementations, associated tunable-frequency coupler devices 214A, 214B, 214F, 214G, 214I and 224B located on boundaries of the islands 802, 804, and within the island of 804 in FIG. 8 are deactivated. In this case, control parameters of the control signals to tune coupler flux biases on these associated tunable-frequency coupler devices can be determined, when the added single-qubit identity gates 704, 706 and the two-qubit native quantum logic gate 414-1 are executed in parallel. In some instances, optimal values of the control parameters may be determined by optimizing an objective function (e.g., minimizing the coupling rates). In some implementations, a calibration process is performed with respect to operation 306 of the example process 300 as shown in FIG. 3 or in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data-processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, an augmented group of operations is calibrated in a quantum computing system.

In a first example, a quantum program to be executed by a quantum processing unit is obtained by a quantum computing system which includes a control system and a quantum processing unit. The quantum program includes a sequence of native quantum logic gates of the quantum processing unit. A group of operations corresponding to a time step in the sequence is identified by the control system.

The group of operations includes the native quantum logic gates that are applied to a first subset of qubits in parallel during the time step. An augmented group of operations is defined by adding single-qubit identity gates to the group. The single-qubit identity gates are applied to a second subset of qubits in parallel during the time step. A calibration process is performed, by operation of the quantum computing system, over the first and second subsets of qubits to determine control parameters to execute the augmented group of operations on the quantum processing unit.

Implementations of the first example may include one or more of the following features. The native quantum logic gates include at least one single-qubit native quantum logic gate and at least one multi-qubit native quantum logic gate. The control parameters are stored in a database. The first subset of qubits is defined by a first subset of qubit devices of the quantum processing unit; and the second subset of qubits is defined by a second subset of qubit devices of the quantum processing unit. Performing the calibration process includes delivering calibration signals to the quantum processing unit and obtaining calibration measurements from the quantum processing unit. Using the control parameters to execute the quantum program includes generating control signals according to the control parameters and delivering the control signals to the first subset of qubit devices and the second subset of qubit devices. The control parameters are used to execute the quantum program on the quantum processing unit. Determining the control parameters includes optimizing an objective function configured to maximize a gate fidelity of the native quantum logic gates.

Implementations of the first example may include one or more of the following features. The first subset of qubits is defined by a first subset of qubit devices of the quantum processing unit. The second subset of qubits is defined by a second subset of qubit devices of the quantum processing unit. The first subset of qubit devices is operably coupled to the second subset of qubit devices through respective tunable-frequency coupler devices. Defining the augmented group includes adding control operations to the group. The control operations are applied on the respective tunable-frequency coupler devices in parallel during the time step and configured to deactivate the respective tunable-frequency coupler devices such that the first subset of qubit devices is decoupled from the second subset of qubit devices during the time step.

Implementations of the first example may include one or more of the following features. The control operations are first control operations. The tunable-frequency coupler devices are first tunable-frequency coupler devices. The augmented group includes single-qubit native quantum logic gates applied on the first subset of qubits. The first subset of qubit devices is operably coupled to one another by second respective tunable-frequency coupler devices. Defining the augmented group includes adding second control operations to the group. The second control operations are applied to the second tunable-frequency coupler devices in parallel during the time step and configured to deactivate the second tunable-frequency coupler devices such that first subset of qubit devices is decoupled from one another during the time step.

Implementations of the first example may include one or more of the following features. The control operations are first control operations. The tunable-frequency coupler devices are first tunable-frequency coupler devices. The second subset of qubit devices is operably coupled to a third subset of qubit devices through respective second tunable-frequency coupler devices. Defining the augmented group includes adding second control operations to the group. The second control operations are applied to the second tunable-frequency coupler devices in parallel during the time step and configured to deactivate the second tunable-frequency coupler devices such that the second subset of qubit devices are decoupled from the third subset of qubit devices during the time step.

Implementations of the first example may include one or more of the following features. Determining the control parameters to execute the augmented group of operations includes determining parking values of respective coupler flux biases for flux bias signals to deactivate the respective tunable-frequency coupler devices. Determining the control parameters to execute the augmented group of operations includes determining parking values of respective coupler flux biases for flux bias signals to deactivate the respective second tunable-frequency coupler devices.

Implementations of the first example may include one or more of the following features. The tunable-frequency coupler devices are first tunable-frequency coupler devices. The augmented group includes a two-qubit native quantum logic gate applied on a pair of qubits of the first subset of qubits. The pair of qubits is defined by a first qubit device and a second qubit device of the first subset of qubit devices. The first and second qubit devices are operably coupled by a second tunable-frequency coupler device. Determining the control parameters includes determining a gate-activating value of a coupler flux bias for a flux bias signal applied on the second tunable-frequency coupler device configured to activate the coupling between the first and second qubit devices.

Implementations of the first example may include one or more of the following features. The group of operations is a first group that corresponds to a first time step and includes a first subset of the native quantum logic gates. The single-qubit identity gates include first single-qubit identity gates. A second, distinct group of operations corresponding to a second time step in the quantum program is identified by operation of the control system. The second, distinct group includes a second, distinct subset of the native quantum logic gates applied in parallel during the second time step. An augmented second group of operations is defined by adding second single-qubit identity gates to the second group by operation of the control system. The second single-qubit identity gates are applied in parallel with the second, distinct subset of the native quantum logic gates. The calibration process is performed to determine control parameters to execute the augmented second group of operations.

Implementations of the first example may include one or more of the following features. The tunable-frequency coupler devices are first tunable-frequency coupler devices. The group includes a two-qubit native quantum logic gate applied on a pair of qubits of the first subset of qubits. The pair of qubits is defined by a first qubit device and a second qubit device of the first subset of qubit devices. The first and second qubit devices are operably coupled to a third qubit device through respective second tunable-frequency coupler devices. The augmented group of operation includes the two-qubit native quantum logic gate, a single-qubit identity gate applied on the qubit defined by the third qubit device, and control operations applied on the respective second tunable-frequency coupler devices in parallel during the time step and configured to active the respective second tunable-frequency coupler devices such that the first and second qubit devices are coupled during the time step.

In a second example, a quantum computing system includes a superconducting quantum processing unit and a control system. The superconducting quantum processing unit includes a first tunable-frequency qubit device and a second qubit device. The control system is communicably coupled to the superconducting quantum processing unit. The control system is configured to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
    obtaining a quantum program to be executed by a quantum computing system comprising a control system and a quantum processing unit, the quantum program comprising a sequence of native quantum logic gates of the quantum processing unit;
    identifying, by operation of the control system, a group of operations corresponding to a time step in the sequence, the group of operations comprising the native quantum logic gates that are applied to a first subset of qubits in parallel during the time step;
    defining, by operation of the control system, an augmented group of operations by adding single-qubit identity gates to the group, wherein the single-qubit identity gates are applied to a second subset of qubits in parallel during the time step; and
    causing a calibration process to be performed by the quantum computing system over the first and second subsets of qubits to determine control parameters to execute the augmented group of operations on the quantum processing unit.

2. The method of claim 1, wherein the native quantum logic gates comprise at least one single-qubit native quantum logic gate and at least one multi-qubit native quantum logic gate.

3. The method of claim 1, wherein:
    the first subset of qubits is defined by a first subset of qubit devices of the quantum processing unit,
    the second subset of qubits is defined by a second subset of qubit devices of the quantum processing unit,
    the first subset of qubit devices is operably coupled to the second subset of qubit devices through respective tunable-frequency coupler devices, and
    defining the augmented group comprises adding control operations to the group, wherein the control operations are applied on the respective tunable-frequency coupler devices in parallel during the time step and configured to deactivate the respective tunable-frequency coupler devices such that the first subset of qubit devices is decoupled from the second subset of qubit devices during the time step.

4. The method of claim 3, wherein:
    the control operations are first control operations;
    the tunable-frequency coupler devices are first tunable-frequency coupler devices, the augmented group comprises single-qubit native quantum logic gates applied on the first subset of qubits,
    the first subset of qubit devices are operably coupled to one another by second respective tunable-frequency coupler devices, and
    defining the augmented group comprises adding second control operations to the group, wherein the second control operations are applied to the second tunable-frequency coupler devices in parallel during the time step and configured to deactivate the second tunable-frequency coupler devices such that the first subset of qubit devices are decoupled from one another during the time step.

5. The method of claim 4, wherein determining the control parameters to execute the augmented group of operations comprises:
    determining control parameters to apply the second control operations to deactivate the respective second tunable-frequency coupler devices.

6. The method of claim 3, wherein:
    the control operations are first control operations;
    the tunable-frequency coupler devices are first tunable-frequency coupler devices,
    the second subset of qubit devices are operably coupled to a third subset of qubit devices through respective second tunable-frequency coupler devices, and
    defining the augmented group comprises adding second control operations to the group, wherein the second control operations are applied to the second tunable-frequency coupler devices in parallel during the time step and configured to deactivate the second tunable-frequency coupler devices such that the second subset of qubit devices are decoupled from the third subset of qubit devices during the time step.

7. The method of claim 3, wherein determining the control parameters to execute the augmented group of operations comprises:
    determining the control parameters to apply the control operations to deactivate the respective tunable-frequency coupler devices.

8. The method of claim 3, wherein:
    the tunable-frequency coupler devices are first tunable-frequency coupler devices, the augmented group comprises a two-qubit native quantum logic gate applied on a pair of qubits of the first subset of qubits,
    the pair of qubits is defined by a first qubit device and a second qubit device of the first subset of qubit devices,
    the first and second qubit devices are operably coupled by a second tunable-frequency coupler device, and
    determining the control parameters comprises determining the control parameters of the control operations applied on the second tunable-frequency coupler device to activate the coupling between the first and second qubit devices.

9. The method of claim 3, wherein:
the tunable-frequency coupler devices are first tunable-frequency coupler devices,
the group comprises a two-qubit native quantum logic gate applied on a pair of qubits of the first subset of qubits, the pair of qubits is defined by a first qubit device and a second qubit device of the first subset of qubit devices,
the first and second qubit devices are operably coupled to a third qubit device through respective second tunable-frequency coupler devices, and
the augmented group of operation comprises the two-qubit native quantum logic gate, a single-qubit identity gate applied on the qubit defined by the third qubit device, and control operations applied on the respective second tunable-frequency coupler devices in parallel during the time step and configured to active the respective second tunable-frequency coupler devices such that the first and second qubit devices are coupled during the time step.

10. The method of claim 1, comprising:
storing the control parameters in a database; and
using the control parameters to execute the quantum program on the quantum processing unit.

11. The method of claim 10, wherein:
the first subset of qubits is defined by a first subset of qubit devices of the quantum processing unit,
the second subset of qubits is defined by a second subset of qubit devices of the quantum processing unit,
performing the calibration process comprises:
delivering calibration signals to the quantum processing unit, and
obtaining calibration measurements from the quantum processing unit, and using the control parameters to execute the quantum program comprises generating control signals according to the control parameters and delivering the control signals to the first subset of qubit devices and the second subset of qubit devices.

12. The method of claim 1, wherein determining the control parameters comprises optimizing an objective function configured to maximize a gate fidelity of the native quantum logic gates.

13. The method of claim 1, wherein the group of operations is a first group that corresponds to a first time step and comprises a first subset of the native quantum logic gates, the single-qubit identity gates comprise first single-qubit identity gates, and the method comprising:
identifying, by operation of the control system, a second, distinct group of operations corresponding to a second time step in the quantum program, the second, distinct group comprising a second, distinct subset of the native quantum logic gates applied in parallel during the second time step;
defining, by operation of the control system, an augmented second group of operations by adding second single-qubit identity gates to the second group, wherein the second single-qubit identity gates are applied in parallel with the second, distinct subset of the native quantum logic gates; and
performing the calibration process to determine control parameters to execute the augmented second group of operations.

14. A quantum computing system, comprising:
a control system, communicably coupled to a quantum processing unit, the control system configured to perform operations comprising:
obtaining a quantum program to be executed by the quantum computing system, the quantum program comprising a sequence of native quantum logic gates of the quantum processing unit;
identifying a group of operations corresponding to a time step in the sequence, the group of operations comprising the native quantum logic gates that are applied to a first subset of qubits in parallel during the time step;
defining an augmented group of operations by adding single-qubit identity gates to the group, wherein the single-qubit identity gates are applied to a second subset of qubits in parallel during the time step; and
causing a calibration process utilizing the quantum processing unit over the first and second subsets of qubits to determine control parameters to execute the augmented group of operations on the quantum processing unit.

15. The quantum computing system of claim 14, wherein the quantum processing unit comprises a first subset of qubit devices defining the first subset of qubits and a second subset of qubit devices defining the second subset of qubits, the first subset of qubit devices is operably coupled to the second subset of qubit devices through respective tunable-frequency coupler devices, and:
defining the augmented group comprises adding control operations to the group, wherein the control operations are applied on the respective tunable-frequency coupler devices in parallel during the time step and configured to deactivate the respective tunable-frequency coupler devices such that the first subset of qubit devices is decoupled from the second subset of qubit devices during the time step.

16. The quantum computing system of claim 15, wherein the control operations are first control operations,
the tunable-frequency coupler devices are first tunable-frequency coupler devices,
the augmented group comprises single-qubit native quantum logic gates applied on the first subset of qubits,
the first subset of qubit devices are operably coupled to one another by second respective tunable-frequency coupler devices, and
defining the augmented group comprises adding second control operations to the group, wherein the second control operations are applied to the second tunable-frequency coupler devices in parallel during the time step and configured to deactivate the second tunable-frequency coupler devices such that the first subset of qubit devices are decoupled from one another during the time step.

17. The quantum computing system of claim 16, wherein determining the control parameters to execute the augmented group of operations comprises:
determining the control parameters to apply the second control operations to deactivate the respective second tunable-frequency coupler devices.

18. The quantum computing system of claim 15, wherein:
the control operations are first control operations,
the tunable-frequency coupler devices are first tunable-frequency coupler devices,
the second subset of qubit devices are operably coupled to a third subset of qubit devices through respective second tunable-frequency coupler devices, and defining the augmented group comprises adding second control operations to the group, wherein the second control operations are applied to the second tunable-frequency coupler devices in parallel during the time step and configured to deactivate the second tunable-frequency coupler devices such that the second subset of qubit devices are decoupled from the third subset of qubit devices during the time step.

19. The quantum computing system of claim 15, wherein determining the control parameters to execute the augmented group of operations comprises:
   determining the control parameters to apply the control operations to deactivate the respective tunable-frequency coupler devices.

20. The quantum computing system of claim 15, wherein:
   the tunable-frequency coupler devices are first tunable-frequency coupler devices,
   the augmented group comprises a two-qubit native quantum logic gate applied on a pair of qubits of the first subset of qubits,
   the pair of qubits is defined by a first qubit device and a second qubit device of the first subset of qubit devices,
   the first and second qubit devices are operably coupled by a second tunable-frequency coupler device, and
   determining the control parameters comprises determining the control parameter of the control operation applied on the second tunable-frequency coupler device to activate the coupling between the first and second qubit devices.

21. The quantum computing system of claim 15, wherein the tunable-frequency coupler devices are first tunable-frequency coupler devices,
   the group comprises a two-qubit native quantum logic gate applied on a pair of qubits of the first subset of qubits, the pair of qubits is defined by a first qubit device and a second qubit device of the first subset of qubit devices,
   the first and second qubit devices are operably coupled to a third qubit device through respective second tunable-frequency coupler devices, and
   the augmented group of operation comprises the two-qubit native quantum logic gate, a single-qubit identity gate applied on the qubit defined by the third qubit device, and control operations applied on the respective second tunable-frequency coupler devices in parallel during the time step and configured to active the respective second tunable-frequency coupler devices such that the first and second qubit devices are coupled during the time step.

22. The quantum computing system of claim 14, wherein the operations comprise:
   storing the control parameters in a database; and
   using the control parameters to execute the quantum program on the quantum processing unit.

23. The quantum computing system of claim 14, wherein determining the control parameters comprises optimizing an objective function that comprises maximizing a gate fidelity of the native quantum logic gates.

24. The quantum computing system of claim 14, wherein the group of operations is a first group that corresponds to a first time step and comprises a first subset of the native quantum logic gates, the single-qubit identity gates comprise first single-qubit identity gates, and the method comprising:
   identifying, by operation of the control system, a second, distinct group of operations corresponding to a second time step in the quantum program, the second, distinct group comprising a second, distinct subset of the native quantum logic gates applied in parallel during the second time step;
   defining, by operation of the control system, an augmented second group of operations by adding second single-qubit identity gates to the second group, wherein the second single-qubit identity gates are applied in parallel with the second, distinct subset of the native quantum logic gates; and
   performing the calibration process to determine control parameters to execute the augmented second group of operations.

25. A quantum computing system, comprising:
a quantum processing unit, and
means for performing a calibration process for a quantum program to be executed in the quantum computing system.

\* \* \* \* \*